US00RE33847E

United States Patent [19]

DiBlasio

[11] E Patent Number: Re. 33,847

[45] Reissued Date of Patent: Mar. 17, 1992

[54] DOCUMENT FEEDING, HANDLING AND COUNTING APPARATUS

[75] Inventor: John DiBlasio, Medford, N.J.

[73] Assignee: Brandt, Inc., Bensalem, Pa.

[21] Appl. No.: 876,261

[22] Filed: Jun. 19, 1986

Related U.S. Patent Documents

Reissue of:

[64] Patent No.: 4,474,365
Issued: Oct. 2, 1984
Appl. No.: 288,646
Filed: Jul. 30, 1981

[51] Int. Cl.[5] ..... B65H 5/22

[52] U.S. Cl. ..... 271/3; 271/116; 271/124; 271/215; 271/219; 271/187; 271/315

[58] Field of Search ..... 271/3, 10, 116, 121, 271/124, 270, 273, 187, 315, 215, 219, 274

[56] References Cited

U.S. PATENT DOCUMENTS

| | | | |
|---|---|---|---|
| 1,837,241 | 12/1931 | Van Buren | 271/270 |
| 2,377,525 | 6/1945 | Schutt | 271/274 |
| 2,626,148 | 1/1953 | Johnson | 271/116 |
| 2,652,248 | 9/1953 | Johnson | 271/116 |
| 3,199,864 | 8/1965 | Irvine | 271/270 |
| 3,966,190 | 6/1976 | Grant | 271/42 |
| 3,986,712 | 10/1976 | Hasegawa | 271/124 |
| 4,020,972 | 5/1977 | Lundblad | 221/13 |
| 4,030,413 | 6/1977 | Young | 101/232 |
| 4,034,976 | 7/1977 | Lundblad | 271/10 |
| 4,045,015 | 8/1977 | Sardella | 271/112 |
| 4,128,236 | 12/1978 | Lundblad | 271/10 |
| 4,208,046 | 6/1980 | Shimizu | 271/122 |
| 4,331,328 | 5/1982 | Fasig | 271/270 |

FOREIGN PATENT DOCUMENTS

| | | |
|---|---|---|
| 763916 | 1/1955 | United Kingdom . |
| 976299 | 4/1963 | United Kingdom . |
| 1489671 | 1/1975 | United Kingdom . |
| 1506113 | 7/1976 | United Kingdom . |

OTHER PUBLICATIONS

IBM Technical Disclosure Bulletin, vol. 20, No. 12, p. 5221, May 1978, "Paper Handling Apparatus for Typewriters and Printers", Jenney et al.

*Primary Examiner*—Richard A. Schaefer
*Attorney, Agent, or Firm*—Shenier & O'Connor

[57] ABSTRACT

Apparatus for separating, counting a stacking sheets, including a feed roller and cooperating stripper shoe for permitting the passage of only single sheets fed therebetween, said sheets being moved along a curved path defined by a guide plate cooperating with the feed roll as the sheet emerges from the region between the stripper shoe and feed roll. The leading edge of the sheet moving along said curved path enters into a nip between an acceleration roller and an acceleration idler mounted on a common axis with the feed roll to abruptly accelerate the sheet and drive it into a stacker wheel which delivers the sheet to an outfeed stacker. The feed roll is provided with a plurality of surfaces of differing coefficients of sliding friction to facilitate separation of sheets.

50 Claims, 9 Drawing Sheets

DOCUMENT FEEDING, HANDLING AND COUNTING APPARATUS

Matter enclosed in heavy brackets [ ] appears in the original patent but forms no part of this reissue specification; matter printed in italics indicates the additions made by reissue.

FIELD OF THE INVENTION

The present invention is directed to document handling and counting apparatus and, more particularly, document handling and counting apparatus having more positive and continuous control over sheets being handled, especially during the stripping and separation operations.

BACKGROUND OF THE INVENTION

Document handling and counting apparatus finds widespread use in industrial, commercial and institutional areas. For example, it is extremely desirable to provide such apparatus for accurately counting paper currency for both counting and batching purposes, for example. Obviously, high speed equipment is extremely desirable, but not at the expense of a reduction in counting accuracy. The handling of sheets, such as for example paper currency, at high speed, can be accommodated by present-day apparatus in a rather straightforward manner when the paper currency is brand new or has been in circulation for only a short period of time. On the other hand, paper currency which has been in circulation for quite a while and/or has been roughly treated, mistreated or even mutilated, creates problems during the feeding and stripping operations. For example, the feeding apparatus may cause a sheet with a curled or bent-forward edge to experience further bending or curling, causing the sheet to misfeed or possibly create a jam condition in the handling apparatus. It is also possible that sheets being delivered from the fanning and stripping apparatus to the sheet separation apparatus can be misfed or misdirected due to folds or curling causing a jam condition and/or misfed of sheets, as well as errors in the accumulated count, which may be attributed to the free space region through which the sheets pass in moving from the stripping and feeding apparatus to the acceleration apparatus.

BRIEF DESCRIPTION OF THE INVENTION

The problems encountered in present day equipment, as described hereinabove, are overcome by the apparatus of the present invention which is characterized by comprising feed roll means and acceleration idler means mounted to rotate about a common axis, said feed roll means co-operating with a curved guideway to exert continuous control over a sheet from the time that the sheet is delivered to the feed roll means by picker roll means until the time that the sheet comes under the influence of the acceleration means comprised of an acceleration roller, which forms a nip with the acceleration idler at a position near the downstream end of the aforementioned curved guideway. The curved guideway has a wider entrance way tapering to a narrower exit which guides the individual sheets toward an outfeed stacker utilizing a stacker wheel assembly which facilitates the formation of a neat, compact stack.

The apparatus, in the preferred form, utilizes an acceleration idler roller arranged between a pair of feed rollers, all of which are mounted to rotate about a common axis. A picker roller advances the bottom sheet from a stack of sheets toward the entrance mouth defined by the aforementioned curved guideway and the feed rollers and idler roller. The feed rollers have portions of their surface provide with a coefficient of sliding friction which is greater than the coefficient of sliding friction of the remaining portions of their peripheries. The periphery of the acceleration idler has a surface whose coefficient of friction is selected in accordance with the degree of pulling force desired to be imparted to the sheet being accelerated thereby, such that selection of a high coefficient of friction yields a high pulling force, while alternatively the selection of a low coefficient of friction yields a low pulling force. In addition thereto, compression of the cooperating acceleration rolls, i.e., the acceleration roll and the idler roll, further determines the amount of pull exerted upon the sheet, the higher the compression, the greater the pulling force. The acceleration roller and acceleration idler are preferably completely formed, or at least the outer peripheries thereof, are formed of a resilient, compressible material, to allow for compression of the rollers.

The acceleration roller, when no documents are present, rollingly engages the acceleration idler forming a nip which grabs the leading edge of a sheet entering the nip to rapidly accelerate the sheet. The differing coefficients of friction provided around the surface portions of the feed rollers function to stagger the feeding of sheets, providing a larger gap space between the trailing edge of a downstream sheet and the leading edge of the next fed sheet following said downstream sheet than would otherwise be provided if the periphery was one uniform surface having a constant coefficient of sliding friction.

A stripper shoe cooperates with each feed roller to assist in the stripping of sheets thereby feeding sheets in a one at a time fashion and guiding said sheets to the aforesaid nip. A light source and cooperating light sensitive element detects the distinction between the presence of a sheet and the gaps between adjacent sheets for counting purposes.

The stripper shoes are mounted near the free ends of rotatably mounted arms which are clamped in the operative position by a resilient clamping element to maintain the stripper shoes in the proper position relative to their cooperating feed rollers. Unitary cam means are utilized for simultaneously adjusting the positions of the stripper shoes relative to their associated feed rollers.

The stacker wheel assemblies are mounted upon a shaft provided with a fly wheel for assuring that the last sheet fed to the stacker wheel is delivered to the outfeed stacker plate in the event of an abrupt deenergization of the document handling and counting apparatus.

A dancer roll assembly may be utilized in an alternative embodiment for facilitating the feeding of light fluffy sheets.

The drive train in the apparatus comprises a gear train for establishing synchronism between the feed rollers, acceleration roller and stacker wheels to further enhance the feeding and stripping operations.

OBJECTS OF THE INVENTION AND BRIEF DESCRIPTION OF THE FIGURES

It is therefore one object of the present invention to provide a novel document handling and counting apparatus in which sheets moving between feeding and stripping means toward acceleration means undergo no free space movement assuring the positive feeding of sheets.

Still another object of the present invention is to provide novel apparatus for handling and counting sheets and comprising feed roller means and acceleration idler means which are rotatable about a common axis and which respectively cooperate with stripper means and acceleration means for feeding, stripping and separating sheets in a high speed, reliable and accurate manner such that the leading edges of sheets remain under the influence of the feed rollers up to the moment that the leading edges enter into the nip formed by the idler means and the acceleration means.

Still another object of the invention is to assure that sheets fed to the stacker wheels reach the outfeed stacker even in the event of an abrupt halt in the operation of the apparatus.

The above as well as other objects of the present invention will become apparent when reading the accompanying description and drawing in which:

FIG. 1 is a perspective view showing the document handling and counting apparatus designed in accordance with the principles of the present invention.

FIG. 1*a* shows a plan view of the control panel of the apparatus of FIG. 1.

FIG. 2*a* shows a sectional side elevation of the document handling apparatus of FIG. 1.

FIG. 2*b* shows a sectional rear elevation of the apparatus of FIG. 1 looking in the direction of arrows 2*b*—2*b*' of FIG. 2*a*.

FIG. 3 shows a perspective view of the swingable plate forming part of the in-feed stacker of the apparatus of FIG. 1.

FIG. 4*a* shows a detailed perspective view of the feeding, stripping and acceleration rollers employed in the apparatus of FIG. 1.

FIG. 4*b* shows a rear view of the assembly of FIG. 4*a*.

FIG. 4*c* shows a detailed view of the front portion of the assemblies of FIG. 4*a* and 4*b* further showing the mounting arms for mounting the stripper shoes shown in FIG. 4*a* and 4*b*.

FIG. 4*d* shows a detailed view of one feed roller and stripper shoe showing the manner in which a sheet moves therebetween.

FIG. 4*e* shows a detailed elevational view of one of the stripper mounting arms of FIG. 4*c*.

FIG. 4*f* shows an end view of one feed roller and its associated stripper shoe and the manner in which they cooperate to handle sheets.

FIG. 5*a* is a plan view showing the guides mounted to the stripper support arms of FIG. 4*c* in greater detail.

FIG. 5*b* is an elevational view showing one stripper shoe support arm in greater detail.

FIG. 5*c* shows the top portions of the stripper shoe mounting arms partially sectionalized, further showing the manner in which a common coupling rod is connected therebetween.

FIGS. 5*d*, 5*e* and 5*f* show side elevation, front elevation and rear elevation views of the stripper show shown, for example, in FIG. 4*e*.

FIGS. 6*a* and 6*b* show side and end views of one portion of a feed roller.

FIGS. 7*a* and 7*b* show side end views of a second member of the feed roller which cooperates with the member of the feed roller which cooperates with the member shown in FIGS. 6*a* and 6*b* to collectively form a feed roller.

FIG. 8*a* shows an elevational view of a dancer roll assembly which may be employed in the apparatus of FIG. 2.

FIG. 8*b* shows an exploded perspective view of the dancer assembly of FIG. 8*a*.

FIG. 8*c* is a perspective view of the dancer roll assembly of FIGS. 8*a* and 8*b*.

FIG. 9 shows a simplified plan view of the power train employed in the apparatus of FIG. 2.

FIG. 9*a* shows a side elevational view of the power train of FIG. 9.

DETAILED DESCRIPTION OF THE INVENTION

Figure 1:
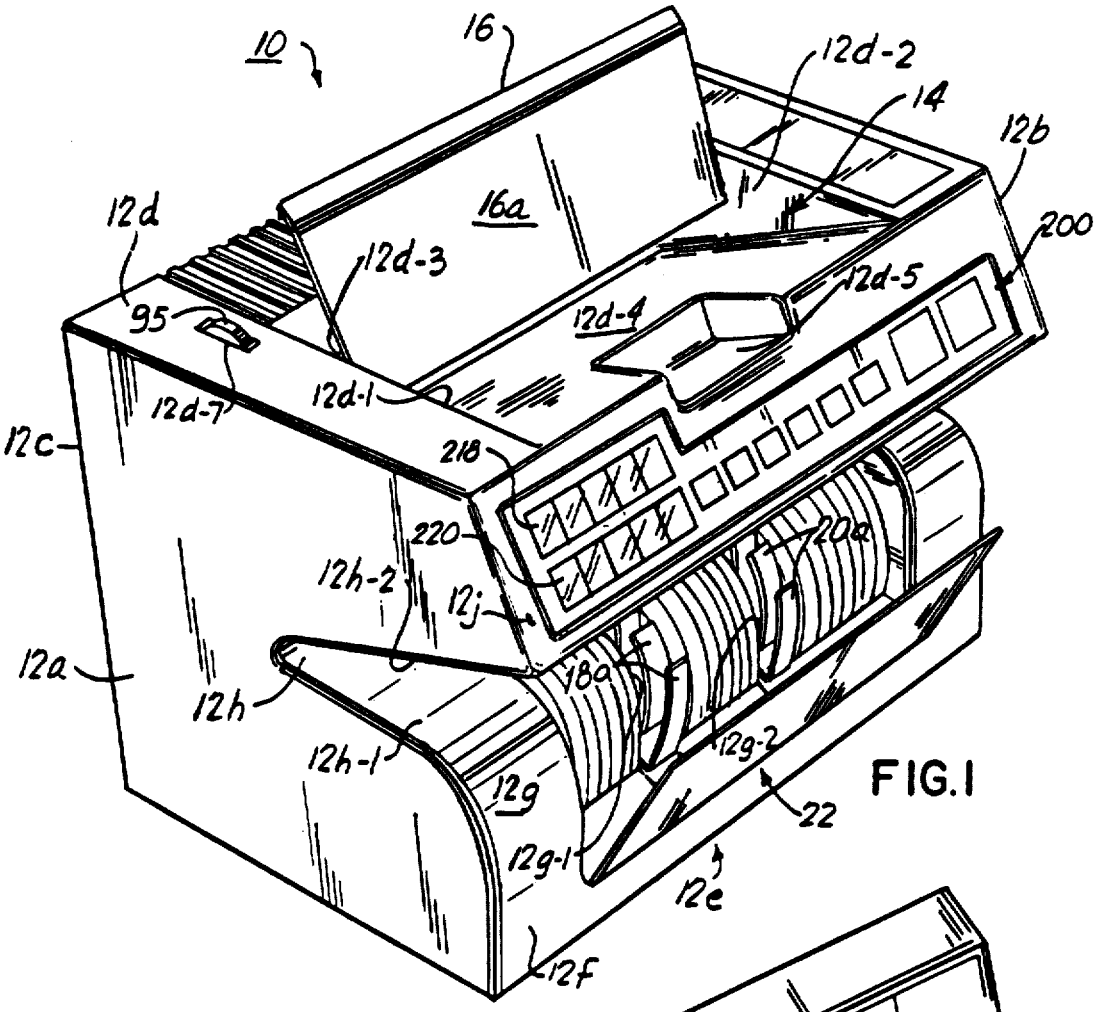

FIG. 1 shows a document handling and counting apparatus 10 embodying the principles of the present invention and comprising a housing 12 for the apparatus 10 which includes left and right hand side walls 12*a* and 12*b*, rear wall 12*c* and a top surface 12*d*. A front 12*e* is comprised of a forward wall 12*f* at the lower end, curving inwardly at 12*g* to form a substantially V-shaped recess 12*h* defined by wall surfaces 12*h*-1 and 12*h*-2. The forward end of surface 12*h*-2 terminates at its outer end where it joins with a diagonally aligned surface 12*j* whose upper end merges with top surface 12*d*.

The top surface 12*d* is provided with a recess defined by a downwardly sloping top surface 12*d*-4 joined on three sides by sidewalls 12*d*-1 and 12*d*-2 and rear wall 12*d*-3. Smaller recess 12*d*-5 defines a region in which an operator may place the fingers of one hand in either depositing or, as desired, removing a stack of sheets from the input stacker 14 defined by the surface 12*d*-1 through 12*d*-5.

Figure 3:
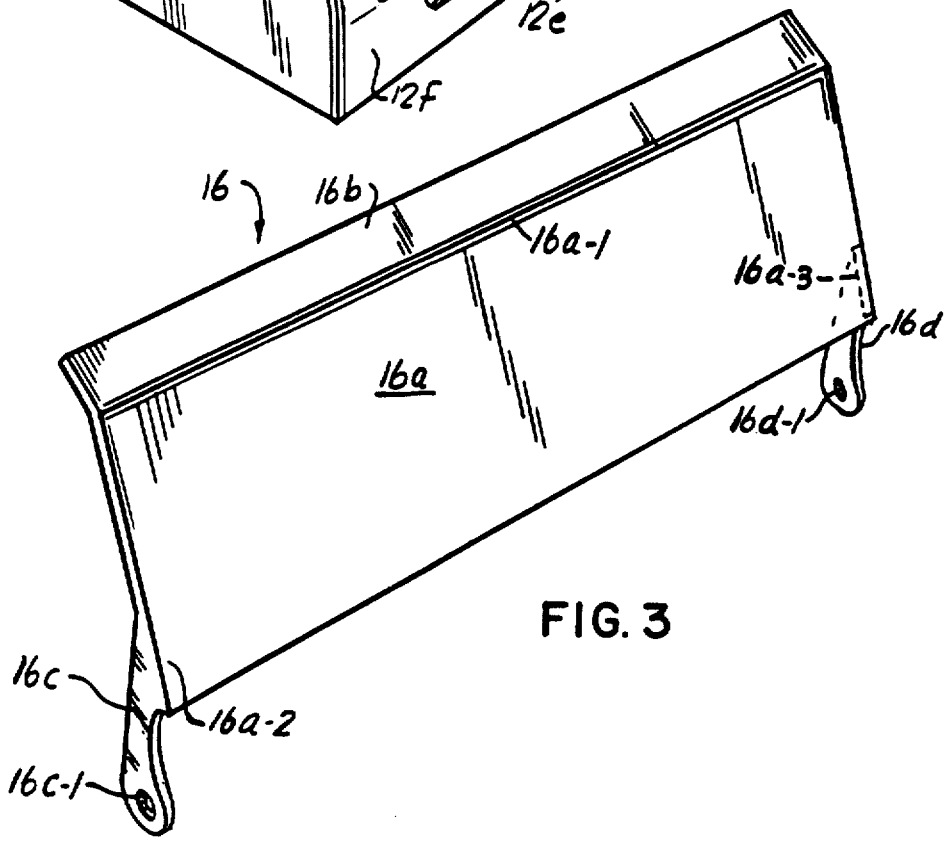

Swingably mounted plate 16, (see also FIG. 3) which forms a part of the input stacker 14, is provided with a major planar surface 16*a* which engages and supports the leading edges of sheets deposited within infeed stacker 14. The upper end of planar surface 16*a* is bent at 16*a*-1 to form a flange 16*b* which extends diagonally away from major surface 16*a*.

A pair of projections 16*c* and 16*d* are integrally joined to major surface 16*a* and extend in a direction perpendicular to surface 16*a* and are integrally joined thereto along bends 16*a*-2 and 16*a*-3. Openings 16*c*-1 and 16*d*-1 are provided in projections 16*c*, 16*d* for receiving the report pins.

As shown in FIG. 1, plate 16 is arranged in the operative position. However, plate 16 may be swung downwardly in the clockwise direction to occupy the dotted line position 16' as shown in FIG. 2*a*, reducing the height of apparatus 10 for carrying or storage purposes.

Figure 1A:
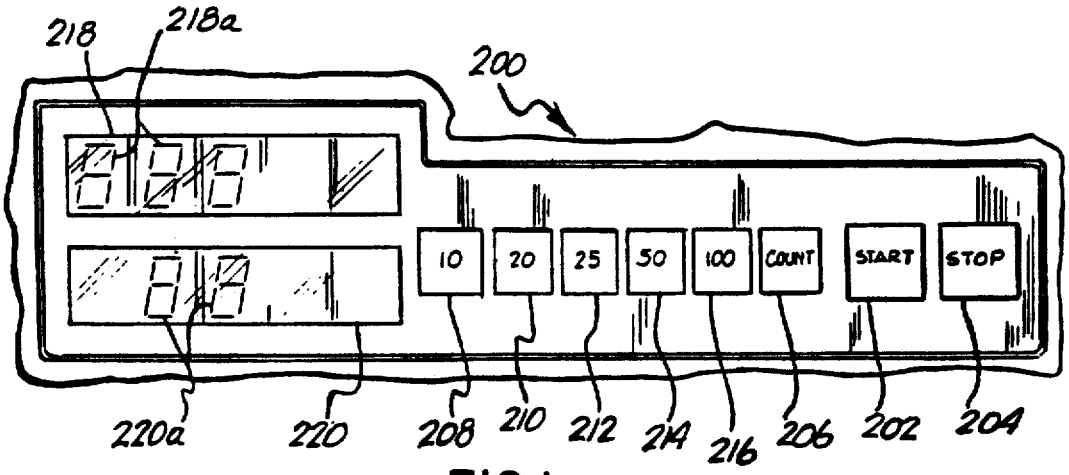

Surface 12*f* functions as the control panel 200 upon which the control switches such as, for example, the switches 204–216, are mounted as shown in detail in FIG. 1*a*.

Curved surface 12*g* is provided with openings 12*g*-1 and 12*g*-2 through which flexible blades 18*a* and 20*a* of stacker wheels 18 and 20 extend. Stacker wheels 18 and 20 will be described in greater detail hereinbelow. For present purposes, it is sufficient to understand that the flexible blades 18*a*, 20*a* cooperate with the curved plate 12*g* having openings 12*g*-1 and 12*g*-2 to strip sheets delivered thereto by the acceleration means 50, to be more fully described, to deliver the stripped sheets to extendable outfeed stacker plate 22.

Figure 2B:
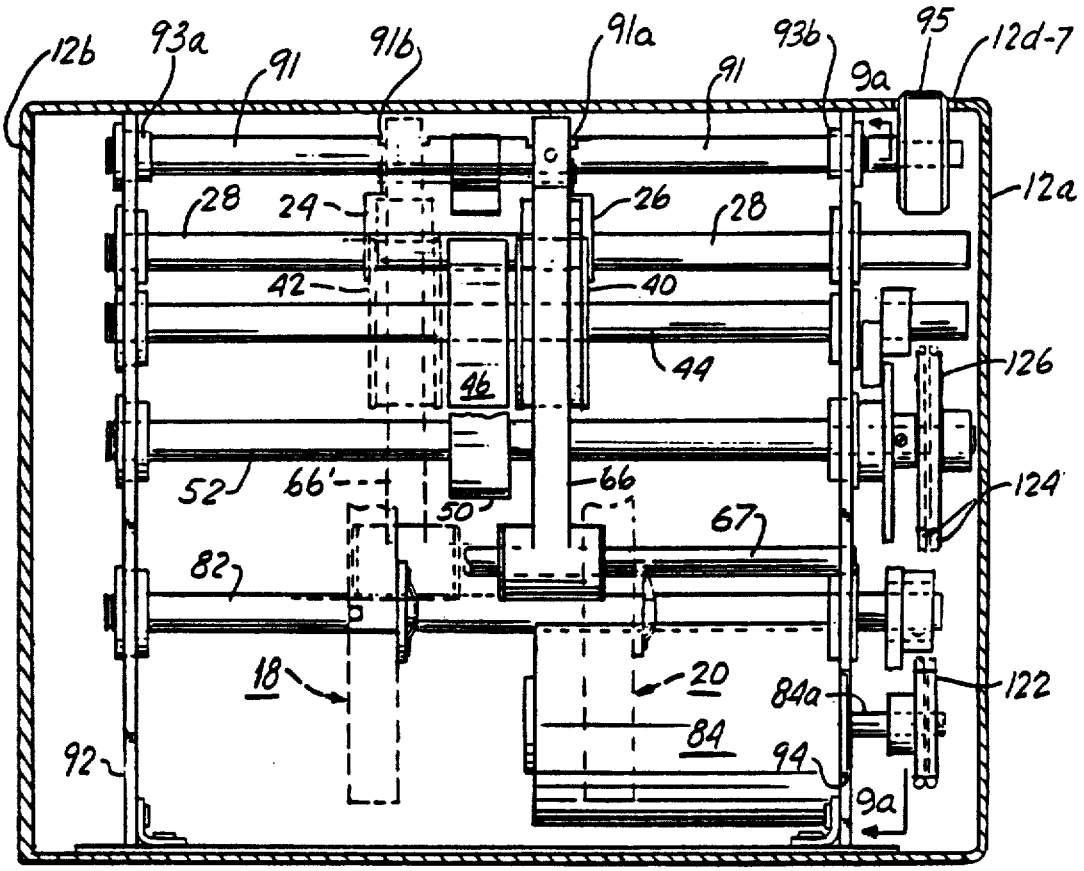
Figure 2A:
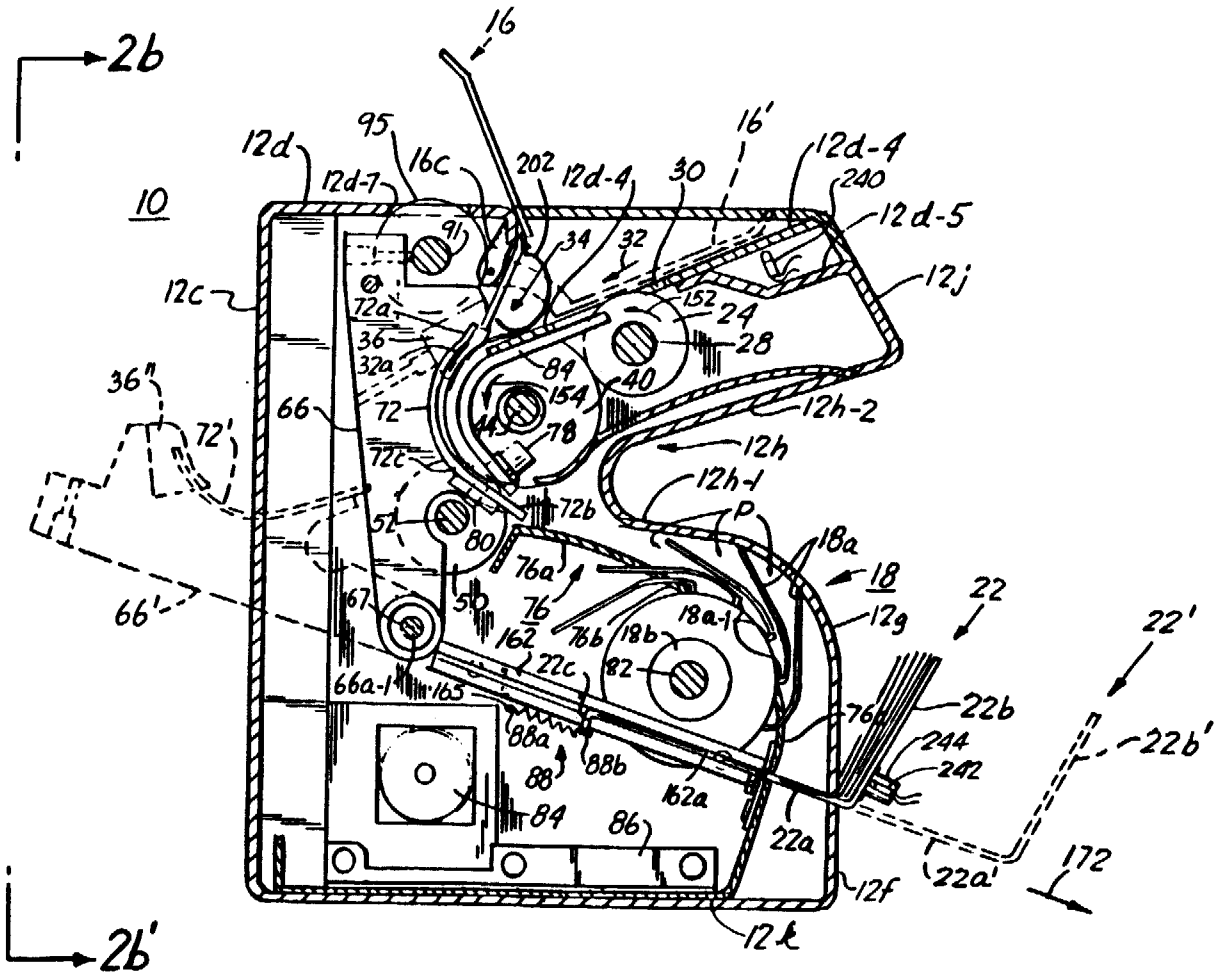

Turning now to a consideration of FIGS. 2*a* and 2*b*, the internal structure of the document handling and counting apparatus 10 is shown with greater particularity and is comprised of a pair of eccentric jogging wheels 24 and 26 mounted for rotation upon shaft 28. Eccentric rollers 24 and 26 extend through an opening 30 in surface 12d-4. The surfaces of rollers 24, 26 are provided with a relatively high friction bearing sleeve for advancing the bottom sheet in the feed direction represented by arrow 32. The eccentric mounting also causes the picker rollers 24 and 26 to "jog" the stack once per revolution to loosen the sheets within the stack and thereby greatly facilitating smooth and accurate handling and feeding of the sheets.

The bottom sheet, having been moved by the picker rolls 24 and 26, advances in the direction shown by arrow 32 toward feeding the stripping assembly 34 comprised of a pair of stripper shoes 36 and 38 and cooperating pair of feed rollers 40 and 42 mounted for rotation upon shaft 44. Note especially FIG. 4a.

The feed rollers 40 and 42 are secured to shaft 44 and rotate in synchronism therewith. Shaft 44 further rotatably supports idler roller 46 which is mounted upon shaft 44 by hearings 48 (see FIGS. 4a and 4b) enabling acceleration idler 46 to rotate in a freewheeling manner relative to shaft 44.

Feed rollers 42 and 44 each cooperate with an associated curved guide plate 72 and 74 respectively, which guide sheets entering in the region between guide plates 72 and 74 and feed rollers 42 and 44 respectively, to cause the sheets to move along a path which defines substantially a half-circle.

Sheets which are advanced toward the guide plates 72 and 74 and feed rollers 42 and 44 first enter into a tapering throat portion T (see FIG. 4e) defined by a stationary stripper shoe 36, 38 respectively associated with each of the feed rollers 42 and 44. Each stripper shoe 36, 38 is provided with a stripper surface (36b-see FIG. 5d) to be more fully described hereinbelow, which surface imparts a frictional drag upon sheets entering into the region between stripper shoes 36 and 38 and feed rollers 42 and 44.

Each of the feed rollers 42 and 44, as will be described hereinbelow in greater detail, is provided with a portion of its periphery having a low coefficient of sliding friction while the remaining peripheral portion, significantly less than a half circle, has a higher coefficient of sliding friction. The aforesaid peripheral portion of the feed rollers 42 and 44 having a higher coefficient of sliding friction cooperate with the stripper shoes 36 and 38 to strip sheets and advance them along the curved path defined by the feed rollers 42 and 44 and the curved guide plates 72 and 74 in the following manner:

(a) The coefficient of friction of the feed rollers 42 and 44 is greater than the coefficient of friction of the stripper shoes 36 and 38 so that when a single sheet passes therebetween, the feed rollers 42 and 44 exert the dominant influence upon a single sheet, causing the sheets to move along the curved feed path represented by arrow 32a.

(b) In the event that two sheets are fed between the stripper shoes 36 and 38 and the feed rollers 42 and 44, the coefficient of friction of the feed rollers 42 and 44 is greater than the coefficient of friction between the engaging surfaces of the sheets. Similarly, the coefficient of friction of the stripper shoes 36 and 38 is greater than the coefficient of friction between the engaging surfaces of the two sheets. Thus, the bottom sheet is advanced in the feed direction by the feed rollers 42 and 44, while the top sheet is substantially restrained from movement due to its engagement with the stripper shoes 36 and 38. Thus, the bottom sheet is advanced along the curved feed path until its trailing edge is out of the region of influence between the stripper shoes 36 and 38 and the feed rollers 42 and 44. At this time, the sheet restrained by the stripper shoes 36 and 38 is now engaged by the higher frictional portion of the feed rollers 42 and 44, causing the advancing action described in operation (a) described hereinabove.

(c) In the case where multiple sheets greater than two are introduced between the stripper shoes 36 and 38 and the feed rollers 42 and 44, the operation is substantially the same as that described in connection with the feeding of a pair of sheets, except that, for example, in the case where there are three such sheets, the bottom-most sheets will be fed first, followed by the middle sheet and thereafter followed by the top-most sheet.

Sheets advanced through the nip defined by the stripper shoes 36 and 38 and the feed rollers 42 and 44 are guided along the curved guide path shown by arrow 32a. As can best be seen from a consideration of FIG. 2a, the upper end 72a of curve guide plate 72 is furthest removed from the surface of feed roller 72. However, the confronting surfaces are gradually closer to the surface of feed rollers 40, 42 moving downstream from the upper end, whereupon the intermediate region 72c of curved guide plate 72, which is upstream relative to the lower end 72b, is closest to the surface of feed rollers 40, 42. Thus, the curved guide plates 70, 72 cause the force exerted upon sheets by the feed roller 72 to gradually increase, with the maximum force exerted upon sheets along the aforesaid curved guide path being in the region of portion 72c of guide plate 72. Although not shown, it should be understood that guide plate 74 cooperates with its associated feed roller 44 to exert substantially the identical influence upon that portion of the same sheet being fed between guide plate 72 and feed roller 42.

Figure 4A:
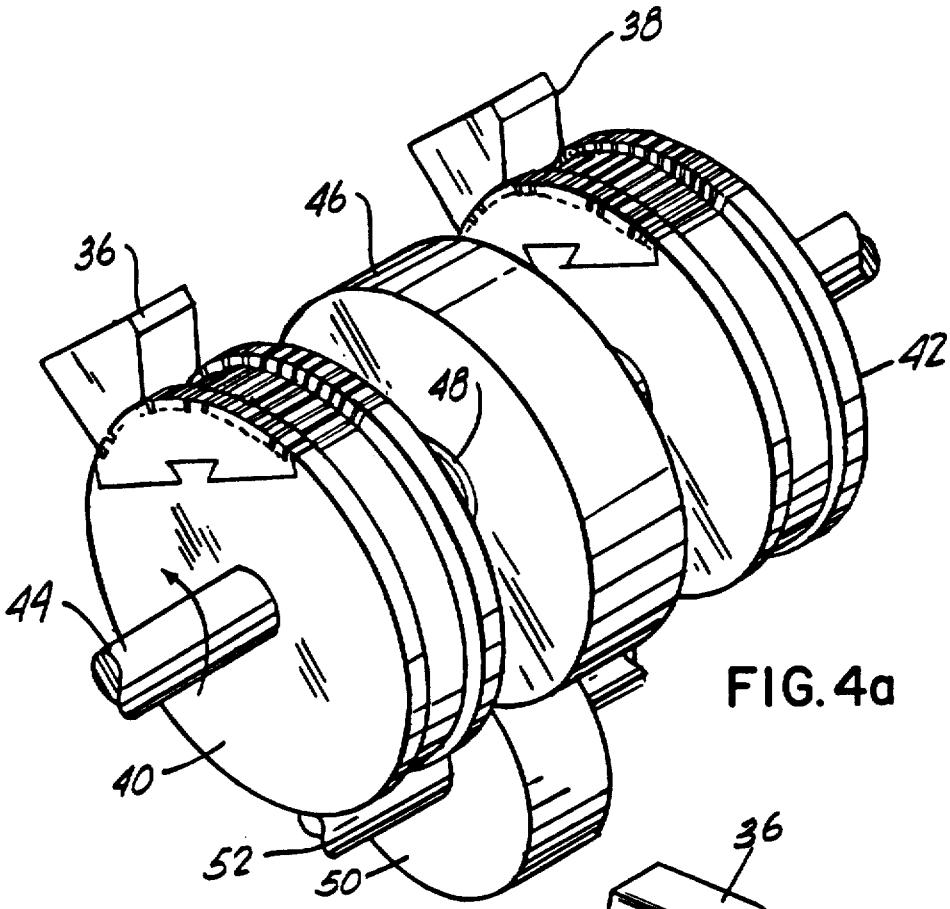
Figure 4B:
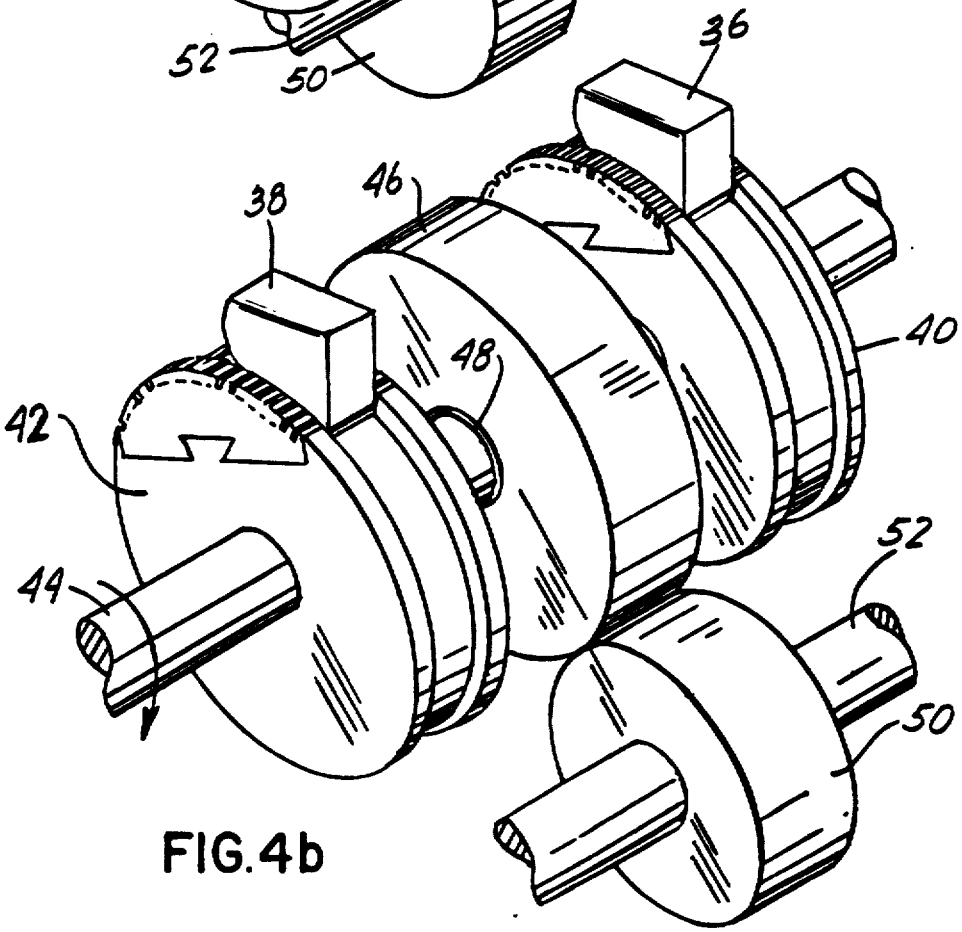

The idler roller 46, shown best in FIGS. 4a and 4b, is freewheelingly mounted upon shaft 44 and is caused to rotate by acceleration roller 50 which is fixed upon shaft 52, which shaft is arranged to rotate under control of the power drive train to be more fully described hereinbelow in connection with FIGS. 9 and 9a.

As was mentioned hereinabove, sheets move in single file fashion between the curved guide plates 72 and 74 and cooperating rollers 40 and 42 at a linear speed substantially established by the tangential velocity of the feed rollers 40 and 42. The driving force exerted upon each sheet by feed rollers 40 and 42 increase in magnitude due to the gradually reducing width of the guide path region described hereinabove. Thus, sheets continuously remain under the influence of the feed rollers 40 and 42 as they first move between the stripper shoes 36 and 38 and the feed rollers 40 and 42 and as they pass beyond the stripper shoes 36 and 38 and move into the region between curved guide plates 72 nd 74 and feed rollers 40 and 42.

The leading edges of sheets moving along the curved feed path eventually enter into the nip N formed by the acceleration roller 50 and the acceleration idler 46, whereupon the sheet is abruptly accelerated towards a linear velocity of significantly greater magnitude than the linear velocity of the sheet prior to entering into the nip N between the acceleration roll 50 and acceleration idler 46. This significant increase in linear velocity causes the sheet moving through nip N, note especially FIG. 4e, causes the trailing edge of said sheet to move increasingly further away from the leading edge of the next sheet being fed toward nip N, thereby forming a significant gap of finite length, measured in the feed direction, which greatly facilitates counting of sheets.

The coefficient of friction at the peripheries of the roller 50 and idler 46 determines the pulling force as well as the amount of compression which roller 50 and idler 46 experience. At least the peripheral portion of roller 50 and idler 46 is formed of a resilient compressible material having a desired coefficient of friction. In one example, roller 50 and idler 46 were formed of a suitable resilient compressible material and having equal diameters of 1.015 inches. The centers of roller 50 and idler 46 were fixed so that their separation distances totalled 1.00 inches in order to obtain a degree of compression to achieve the desired pulling force on a sheet.

As shown best in FIG. 2a, document handling and counting apparatus 10 is provided with a substantially J-shaped mounting plate 84. Light source 78, such as, for example, a light emitting diode (LED) mounted upon plate 84. Plate 84 is provided with a hole which is coincident with LED 78, allowing LED 78 to direct light across the aforementioned curved guide path and toward curved guide plate 72, which is provided with a light sensitive element 80, such as, for example, a photo diode or phototransistor and which is mounted to curved guide plate 72 and is coincident with the hole provided therein enabling the light from LED 78 to be directed toward light sensitive element 80. The light intensity reaching light sensitive element 80 is maximum in the absence of a sheet moving therebetween, i.e. in the presence of a gap between adjacent sheets. The transmissivity of sheets moving between elements 78 and 80 is sufficient to cause a significant drop in the intensity of light reaching light sensitive element 80, thereby enabling sheets to be accurately counted due to the ability of the elements 78 and 80 to distinguish between sheets and gaps between sheets.

Accelerated sheets are advanced along curved guide plates 72 and 74 and are advanced toward a guide plate 76 whose end 76a adjacent curved guide plates 72 and 74 is substantially flat. A portion 76b forms a curved convex surface which partially surrounds stacker wheel assemblies 18 and 20. Thereafter, plate portion 76b merges with a substantially planar portion 76c, which is diagonally aligned relative to an imaginary vertical axis and which extends downwardly and merges with base 12k of housing 12 and is joined thereto by suitable fastening means (not shown for purposes of simplicity).

Each sheet advanced along the curved guide plates 72 and 74, engages planar portion 76a of guide plate 76 and enters into a pocket P between a pair of adjacent flexible blades 18a (20a) which collectively cooperate to form a substantially curved shape pocket which serves to decelerate a sheet entering into a pocket P, so that when its leading edge engages the extreme inner end of a pocket defined by the radial portion 18a-1 of each flexible blade 18a, the sheet is decelerated by a significant amount so that it will be prevented from striking a radial edge 18a-1, rebounding therefrom, and either partially, significantly, or completely moving out of its pocket P.

Stacker wheels 18 and 20 carry each sheet over an angular path greater than 90° but less than 180°, to a point where the blades 18a, 20a move from the right-hand side of curved plate portion 76c through plate 76c and emerge on the left hand side of plate 76c.

Each sheet is moved by the stacker wheels 18, 20 so that its leading edge engages the right-hand surface of plate portion 76c and is prevented from moving through the plate portion 76c. Plate portion 76c serves a "stripping" function in that it serves to strip sheets from their associated pockets P as the resilient flexible blades 18a, 20a forming pockets P pass through plate portion 76c whereupon sheets are deposited upon an outfeed stacker assembly 22 defined by a linearly slidable plate having a first major substantially planar portion 22a whose free end is bent diagonally upwardly to form a sheet supporting end portion 22b.

Leading edges of sheets stripped from the pockets P of stacker wheels 18 and 20 are engaged and supported by planar portion 22a of the output stacker assembly 22. The first sheet fed to the output stacker assembly 22 has its right hand surface engaged by sheet supporting plate portion 22b, which becomes the right-hand-most sheet of the stack of sheets S collected on stacker plate assembly 22.

The resilient flexible blades 18a and 20a, after having released sheets from the pockets P formed thereby, further serve to beat against the last sheet fed to the stacker assembly 22 urging sheets towards plate portions 22a and 22b, causing a neat, compact stack of sheets to be formed in the outfeed stacker assembly 22. As the size of the stack increases, the stacker assembly 22 which is spring-loaded by means of helical spring 88, is urged to move against the force of spring 88 from the solid line position 22 shown in FIG. 2a toward the dotted line position 22', also shown in FIG. 2a, to accommodate a stack of sheets of increasing size.

It can thus be seen from the relatively brief description set forth hereinabove, that the apparatus 10 is designed to receive a stack of sheets in infeed stacker 14, advance said sheets by means of picker rolls 24, 26 toward a cooperating stripper shoe (36)/feed roll (40) assembly which permits sheets to be advanced toward the outfeed stacker assembly 22 in a single file one-at-a-time fashion and which further provides acceleration means (50) for creating a gap between the adjacent edges of successively fed sheets to assure accurate counting of sheets which are being handled at high speed.

The most significant feature of the present invention resides in the novel arrangement of the feeding and stripping assemblies and the acceleration assembly 46, 50 which are physically arranged so that the feed rollers 40, 42 do not relinquish driving control upon sheets until the instant upon which the leading edges of sheets driven by the feed rollers 40, 42 enter into the nip N between the acceleration roll 50 and acceleration idler 46, rendering it a practical impossibility for sheets to be diverted away from the acceleration roll 50 and idler 46 as they leave the influence of the feed rollers 40 and 42, which undesirable operation can occur in prior art arrangements in which the feed (40, 42) and stripper (36, 38) assemblies are separated from the acceleration assemblies (46, 50) by a finite distance, enabling sheets to move through a "free space" region, the result of which may be an unsatisfactory feeding operation.

In addition to the above, sheets which are extremely light and fluffy, as well as sheets having a residual curve or crease tend to be diverted away from the desired feed direction or, alternatively, tend to experience unstable and/or unreliable movement through a "free space" region. Their movement toward an acceleration assembly tends to be nonuniform, erratic, and even faulty, leading to possible jamming of the apparatus, as well as the introduction of counting errors.

Figure 4C:
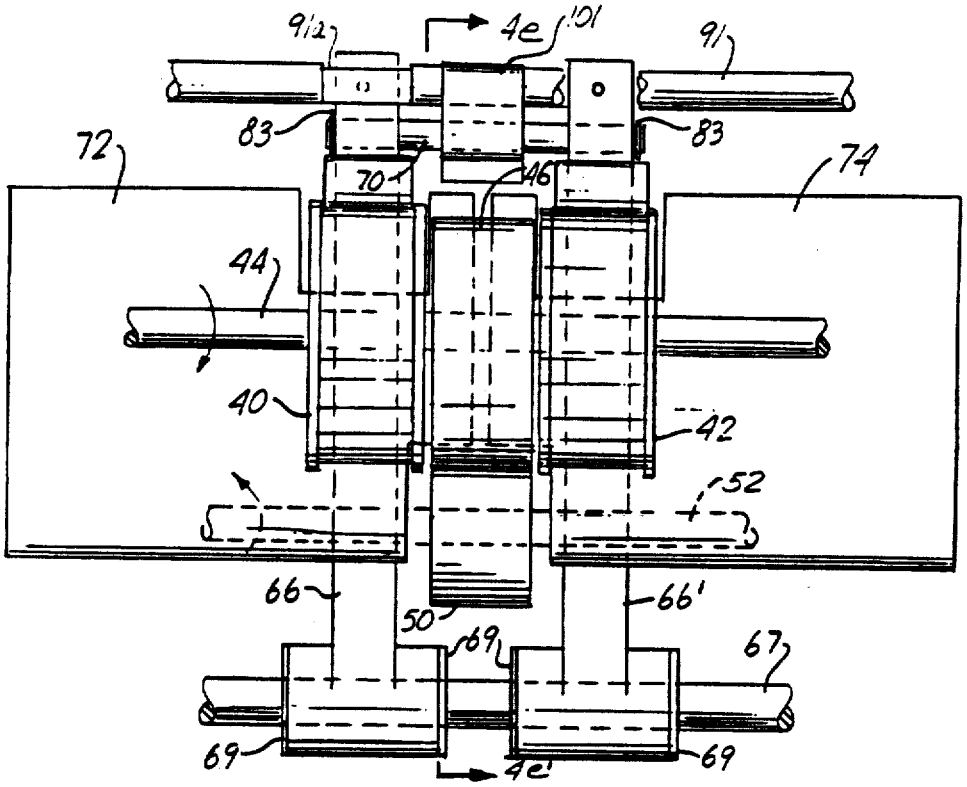

The feed roller assemblies are shown in greater detail in FIGS. 4*a* through 4*c*, while FIGS. 6*a* through 7*b* show the detailed construction of a feed roller 40. Since feed rollers 40 and 42 are substantially identical in both design and function, a detailed description of only one such feed roller will be provided herein for purposes of simplicity.

Figure 6A:
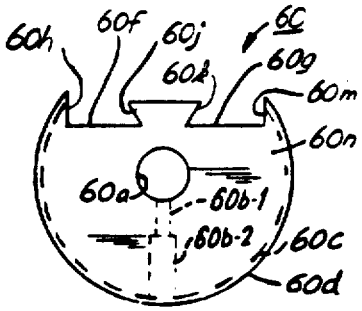
Figure 6B:
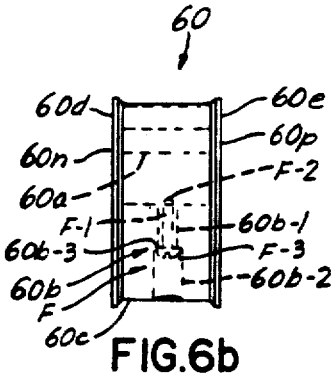
Figure 7A:
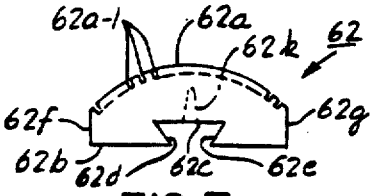
Figure 7B:
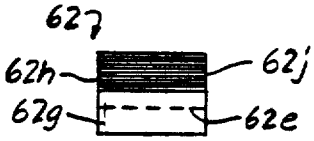

Considering FIGS. 6*a* through 7*b*, it can be seen that each feed roller, for example feed roller 40, is comprised of feed roller portions 60 (see FIGS. 6*a* and 6*b*) and 62 (see FIGS. 7*a* and 7*b*). Portion 60 is a substantially circular member having a truncated portion defined by vertical sidewalls 60*h* and 60*m*, horizontal surface portions 60*f* and 60*g*, and a pair of diagonally aligned walls 60*j* and 60*k* respectively cooperating with horizontal surfaces 60*f* and 60*g* to form a pair of cooperating, undercut grooves. The circular periphery of member 60 has a angular recess 60*c*, bordered on opposite sides by the angular flanges 60*d* and 60*e*.

Member 62 shown in FIGS. 7*a* and 7*b* is designed to be interfitted with member 60 and is comprised of a solid block of material having a coefficient of friction which is substantially greater than the coefficient of friction of the material from which member 60 is formed. Member 62 is provided with a curved surface 62*a* having a plurality of spaced parallel grooves 62*a*-1 cut into surface 62*a* at regularly spaced intervals. Curved surface 62*a* terminates on opposite ends in a pair of vertical sidewalls 62*f* and 62*g*. Bottom surface 62*h* is provided with a double undercut groove defined by a pair of diagonally aligned sidewalls 62*d* and 62*e* joined with a flat surface 62*e* in the base of the double undercut groove. Member 62 is interfitted with member 60 by sliding the substantially wedge-shaped projection defined by sidewalls 60*j* and 60*k* into the double undercut groove provided in member 62. The members 60 and 62 are pressed together until surfaces 60*n* and 62*h* are coplanar. Since members 60 and 62 are substantially equal in thickness, side surfaces 62*j* and 60*p* are likewise coplanar when surfaces 60*n* and 62*h* are in coplanar relationship.

When the members 60 and 62 are interfitted in the manner described hereinabove, vertical side surfaces 62*f* and 62*g* (see FIG. 7*a*) are engaged by cooperating vertical side surfaces 60*h* and 60*m* (see FIG. 6*a*). In order to permanently secure members 60 and 62 to one another, in addition to the interlocking arrangement as shown, the engaging surfaces of members 60 and 62 are preferably coated with a suitable glue or epoxy, (not shown) to ensure permanent securement between members 60 and 62.

Member 62 may be formed or premachined in order to provide a recess which is coextensive with the recess 60*c* provided in member 60. Alternatively, member 62 may be formed so that its curved surface 62*a* lies a greater radial distance from the center of opening 60*a* than the peripheries of flanges 60*d* and 60*e*. The feed roller may then be machined on a machine tool, such as, for example, a lathe (not shown), and is initially machined to reduce the outer periphery of surface 62*a* and is subsequently machined to form a recess 62*a*-2, (note especially FIG. 4*d*), coextensive with recess 60*c*.

The feed wheels 40 and 42 may be joined to the driving shaft 44 by the central opening 60*a* provided therefor. In order to lock each feed wheel to shaft 44, each body portion 60 is provided with a radially aligned opening 60*b* which is comprised of an opening portion 60*b*-1 of a first diameter, which communicates with a second opening portion 60*b*-2 of slightly greater diameter for communication between central opening 60*a* and peripheral recess 60*c*. A set screw F is placed within opening 60*b* so that its threaded portion F-1 threadedly engages tapped opening 60*b*-1 and so that its head F-3 is prevented from moving beyond shoulder 60*b*-3 arranged between threaded opening 60*b*-1 and larger diameter opening 60*b*-2. The free end F2 of set screw F is arranged to bear against the surface of shaft 44 in order to lock its feed roller to common shaft 44.

Figure 5A:
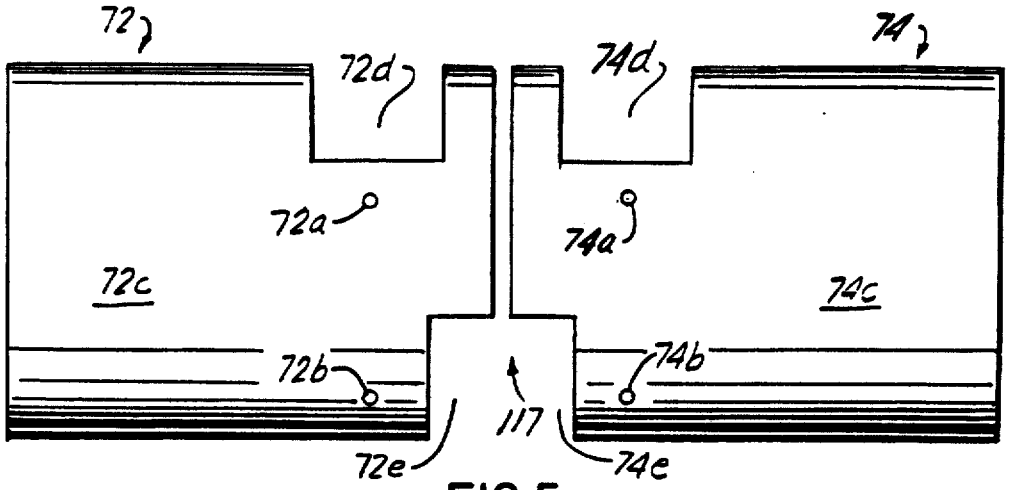
Figure 5B:
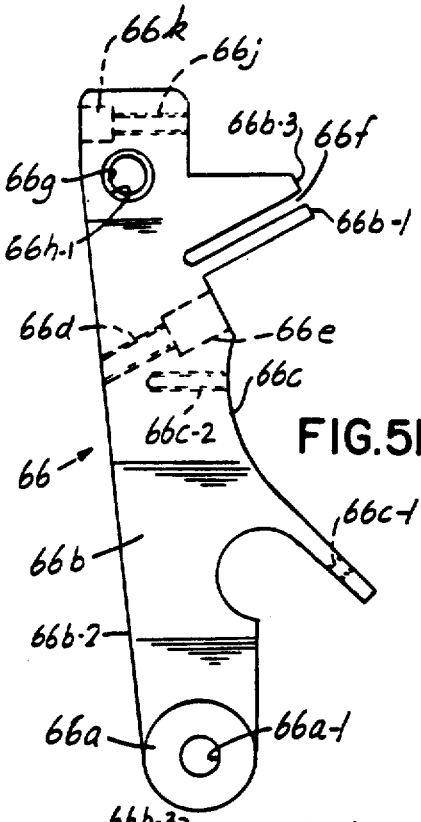
Figure 5C:
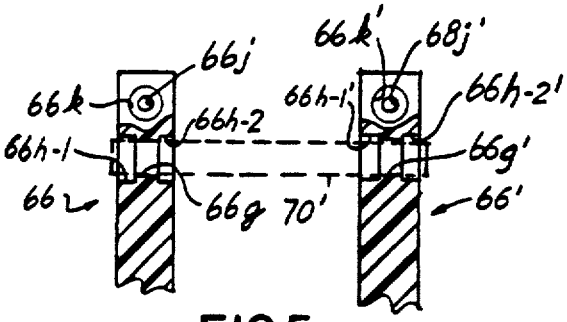
Figure 5D:
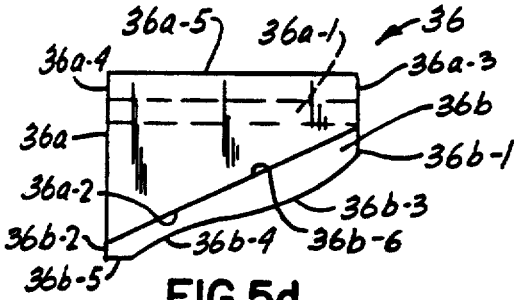
Figure 5F:
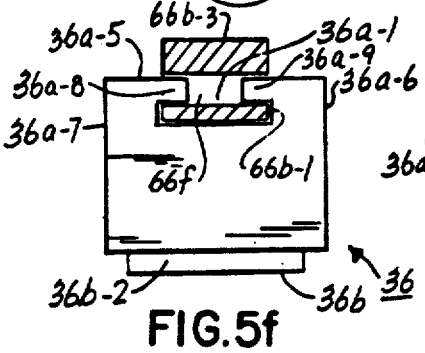
Figure 5E:
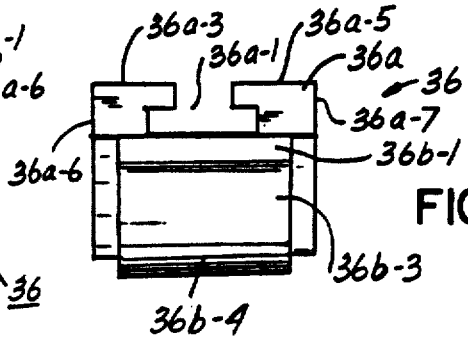

The stripper shoes 36 and 38 are shown in detail in FIGS. 5*d* through 5*f*. Only one such stripper shoe 36 is shown for purposes of simplicity, it being understood that both stripper shoes 36 and 38 are substantially identical in both design and function.

Stripper shoe 36, shown in FIGS. 5*d* through 5*f*, is comprised of a mounting portion 36*a* having a substantially trapezoidal shape so far as side faces 36*a*-6 and 36*a*-7 are concerned. Top surface 36*a*-5 is provided with a double undercut groove 36*a*-1, which cooperates with a projection provided in stripper mounting arm 66 to be more fully described in connection with FIGS. 4*e* and 5*b*.

Diagonally aligned surface 36*a*-2 of mounting member 36*a* has secured thereto the frictional shoe portion 36*b*, preferably by means of a suitable glue or epoxy. The stripper shoe portion 36*b* is a rather slender member having a planar rear surface 36*b*-6 engaging and secured to surface 36*a*-2 and having an opposed curved surface comprised of a convex surface portion 36*b*-3, joined with a concave curved surface portion 36*a*-4. The right-hand end of convex surface portion 36*b*-3 meets vertically aligned surface 36*b*-1 while the left-hand end of concave curved surface portion 36*b*-4 terminates in a flat, horizontally aligned surface 36*b*-5 which in turn terminates with vertically aligned short surface portion 36*b*-2. The convex curved surface portion 36*b*-3 cooperates with its associated feed roller, such as, for example, feed roller 40, to form a tapering entrance throat T (see FIG. 4*e*).

As was mentioned hereinabove, stripper shoe assembly 36 shown in FIGS. 5*c* through 5*f*, is adapted to be slidably mounted upon stripper mounting arm 66 which is comprised of a substantially cylindrical portion 66*a* having a central opening 66*a*-1 for receiving shaft 67 (see FIG. 2) which pivotally mounts stripper arm 66. As shown best in FIGS. 2*b* and 4*c*, clips 69 are provided on opposite sides of the pair of stripper arms 66 and 66' to prevent the stripper arms 66 from experiencing any linear movement along the axis of shaft 67. The upper end of arm portion 66*b* which extends from cylindrical portion 66*a*, is provided with elongated slot 66*f*. Slot 66*f* is defined by arm 66-1 which is arranged to be inserted within the recess 36*a*-1 while arms 36*a*-8 and 36*a*-9 are arranged to be inserted within elongated slot 66*f*, as shown best in FIG. 5*f*. A diagonally aligned threaded opening 66*d* is provided in arm 66*b*. The left-hand end of threaded opening 66*d* communicates with the left-hand edge 66*b*-2 of arm portion 66*b*. The right-hand end of threaded opening 66*d* terminates in an enlarged opening 66*e*. A threaded set screw 71, shown best in FIG. 4*e*, threadedly engages tapped opening 66*d* and has its right-hand end extending through opening 66*e* so that tip 71*a* engages the rear surface 36*a*-4 of the upper portion 36*a* of stripper shoe assembly 36. The stripper shoe is retained within the stripper mounting arm 56*b* by virtue of the feeding operation. Set screw 71 is adjustable to move stripper shoe assembly 36 in either of the directions shown by double-headed arrow 73 of FIG. 4e in order to properly orient and align the stripper shoe 36 relative to its associated feed roller 40.

The upper end of arm 66b is provided with a narrow diameter opening 66g which terminates on opposing sides with larger diameter openings 66h-1 and 66h-2, as can best be seen in FIG. 5c, which shows the upper portion of stripper arms 66 and 66', partially sectionalized. A common rod 70 has a narrow diameter which is less than the inner diameter of openings 66g and 66g', enabling common rod 70 to slidably extend through the stripper mounting arms 66 and 66' in the manner shown in FIGS. 5c and 4c. Clips 83, 83 are arranged respectively along the left and right-hand sides of stripper arms 66 and 66' to prevent common rod 70 from becoming dislodged from mounting arms 66, 66'. The larger diameter openings 66h-1 through 66h-2' permit stripper mountings arms 66 and 66' to experience movement relative to common rod 70 enabling rod 70 to become skewed relative to the arms 66 and 66', which facilitates separate and independent alignment of the stripper arms 66, 66', as will be more fully described. The common rod 70 serves as a means for simultaneously moving both stripper arms 66, 66' from the operative position shown in solid line fashion in FIG. 2a, to the open position 66" to facilitate inspection, maintenance, and the like.

The upper end of arm 66b is provided with a threaded opening 66j which communicates with a side edge 66b-3 at its right-hand end, while its left-hand end communicates with an enlarged diameter opening 66k which terminates in left-hand side 66b-2. A set screw 89, shown best in FIG. 4e, threadedly engages tapped opening 66j. Its forward tip 89a is designed to engage an eccentric cam-shaped surface 91a provided in shaft 91. Shaft 91 extends across the frame of the document handling and counting apparatus 10 as shown best, for example, in FIG. 2b and is journaled in frame members 92 and 94 by bearings 93a and 93b. The free right-hand end of shaft 91 has a knurled operating handle 95 secured cured thereto. Operating handle 95 extends through an opening 12d-7 in top surface 12d as shown in FIGS. 1 and 2b in order to facilitate rotation of operating member 95 to rotate shaft 91. Rotation of operating member 95 and shaft 91 rotates the first and second eccentric cam surface 91a and 91b, shown best in FIG. 2b, relative to set screws 89 in order to simultaneously provide movement of the stripper supporting arms 66 and 66' in either the clockwise or counterclockwise direction about shaft 67, as shown best in FIG. 2a. In addition thereto, individual and independent adjustment of each stripper mounting arm 66, 66' is accomplished by means of the set screw 89, shown best in FIG. 4e, which threadedly engages tapped opening 66j, enabling its forward end 89a to be adjusted in either direction in accordance with the double-headed arrow 99 shown in FIG. 4e. This adjustment in turn establishes the position of the associated arm 66 which in turn determines the position of its associated stripper shoe assembly 36 relative to its cooperating feed roll 40, for example. Once the stripper shoes 36 and 38 are independently adjusted relative to their associated feed rolls 40 and 42, the stripper arms 66, 66' may simultaneously be moved by manipulation of the operating member 95, shown in FIGS. 2a and 2b to readjust the stripper shoes 36, 38 to compensate for wearing. By providing larger diameter openings 66h-1, 66h-2, on opposite sides of opening 66g in stripper mounting arm 66, the stripper mounting arm 66 is free to experience movement due to the adjustment of set screw 89 sufficient to allow the central axis of common rod 70 to become skewed relative to the central axis of opening 66g so that some independent swinging adjustment of each arm 66, 66' may be attended to without affecting the position of the other arm.

Figure 4F:
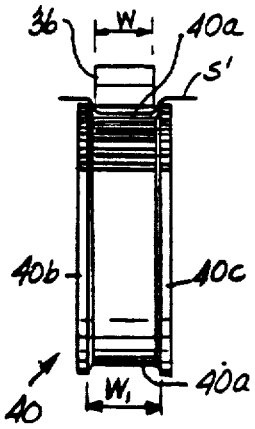
Figure 4E:
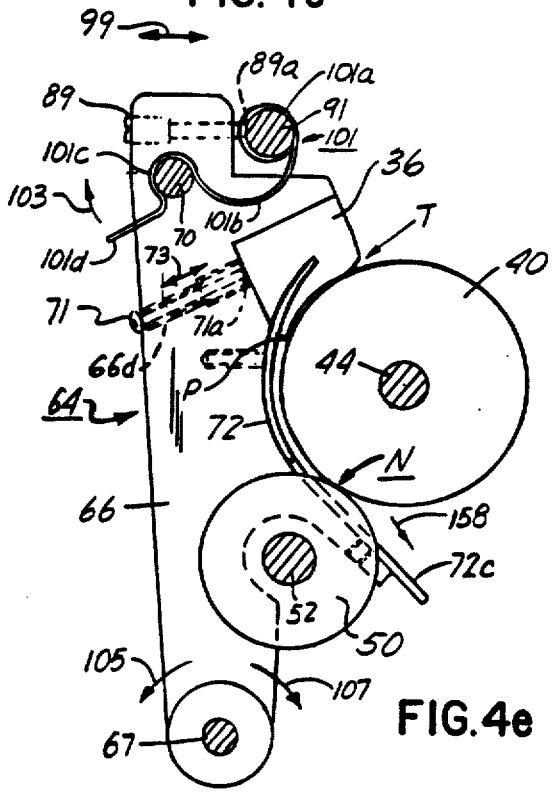

Both arms 66, 66' may be simultaneously moved to the operative position shown in solid line fashion 66 in FIG. 2a, as well as the open position 66' of FIG. 2a, by gripping common rod 70. In order to retain both arms 66 and 66' and common rod 70 in the operative position, there is provided a spring-like locking member 101 shown best in FIGS. 4c and 4c, which is bent at its right-hand end to form an encircling portion 101a for encircling elongated rod 91, as shown best in FIG. 4e. The resilient locking member 101 is provided with an intermediate substantially U-shaped portion 101b which is integrally joined with a second substantially C-shaped portion 101c, whose free end terminates in a substantially straight portion 101d. FIG. 4e shows stripper mounting arm 66 in the operative position and likewise shows resilient locking member 101 in the locked position with C-shaped portion 101c locked and substantially encircling common rod 70. In order to move the stripper shoe mounting arms 66, 66' from the operative position to the open position, portion 101d of resilient locking member 101 is gripped by the fingers and is lifted or swung upwardly as shown by arrow 103, to lift C-shaped portion 101c away from rod 70. Rod 70 is then free to be swung in the direction shown by arrow 105 about shaft 67, i.e. is swung counterclockwise relative to FIG. 4e to the dotted line position 66" shown in FIG. 2b. It should be understood that both arms 66 and 66' are simultaneously swung downwardly to the open position by pulling down rod 70. In this position, inspection and/or maintenance of the apparatus 10 is facilitated. In addition, it is also very simple to remove and replace a stripper shoe assembly 36, 38, if desired.

After such inspection and/or maintenance, the stripper mounting arms 66 and 66' may be moved back to the operative position by gripping common rod 70 and swinging rod 70 about pivot pin 67 in the direction shown by arrow 107, i.e. clockwise about shaft 67, to move the stripper mounting arms to the solid line position 66 shown in FIG. 2a. The stripper mounting arms 66, 66' are retained in the operative position by swinging resilient locking member 101 in the counterclockwise direction about shaft 91 to bring C-shaped portion 101c into the locking position relative to common rod 70, as shown best in FIG. 4e. C-shaped portion 101c substantially encircles and releasably grips more than 180 degrees of the surface of rod 70, so as to be retained in a self-locking condition. The resilient locking member 101 is preferably formed of a spring steel material serving to provide a resilient biasing force which is exerted upon common rod 70, and hence upon stripper mounting arms 66, 66' in order to normally urge the stripper shoe assemblies 36, 38 toward their respective feed rolls 40, 42.

Turning again to FIG. 5b, it can be seen that arm 66b is provided with a curved surface 66c. A pair of tapped apertures 66c-2 and 66c-1 are provided in arm 66b and communicate with curved surface 66c. Surface 66c conforms with the shape of curved guide member 72, which is provided with a pair of openings 72a, 72b arranged to be brought into alignment with threaded apertures 66c-2 and 66c-1 respectively for receiving threaded fastening members, not shown for purposes of simplicity, which secure curved guide plate 72 to its associated stripper mounting arm 66. It should be understood that the heads of the fastening members are arranged so as to be either flush with the concave surface 72c of the curved guide plate 72 (note FIG. 4e) or slightly below surface 72c so as to avoid any possibility of interfering with the free movement of sheets in the curved region between each curved guide plate surface 72c and its associated feed roller 40 shown, for example, in FIG. 4e.

The curved guide plates 72 and 74 are shown best in FIGS. 4c, 5a and 4e. Noting especially FIGS. 4c and 5a, each curved guide plate 72, 74 is provided with a substantially square-shaped slot 72d, 74d which provides clearance for its associated stripper shoe assembly 36, 38. Each curved guide plate 72, 74 is further provided with a right angle shaped notch portion 72e, 74e which portions cooperate to form a substantially square-shaped slot 117, which provides clearance for acceleration roller 50, shown best in FIG. 4c.

As was described hereinabove, each of the curved guide plates 72, 74 is permanently secured to an associated stripper shoe mounting arm 66, 66' and, as a result, the curved guide plates 72, 74 are moved to the operative position shown in solid line fashion in FIG. 2a, and to the dotted line position 72', also shown in FIG. 2a, simultaneously with the movement of the associates stripper arm 66, 66''. Thus, the clearing of any possible jam condition and/or the inspection and maintenance of the equipment is greatly simplified whereupon the stripper mounting arm 66, 66' and stripper shoes 36, 36' and curved guide plates 72 and 74 are all displaced a significant distance away from their operative position to greatly facilitate inspection and/or maintenance of apparatus 10.

Considering FIGS. 9 and 9a, the drive train for the apparatus 10 is shown, and will now be described in detail. The drive train is comprised of a single motor 84, shown also in FIG. 2a, and having an output shaft 84a upon which is mounted pulley 122. A pair of O-rings 124 is entrained about pulley 122 and a second pulley 126 mounted upon shaft 52 upon which acceleration roller 50 is mounted. Rotation of output shaft 84 is thus imparted to shaft 52 through pulley 122, O-rings 124 and pulley 126.

A gear 128 is mounted upon shaft 52 and meshes with larger diameter gear 130. Gear 128 also meshes with a larger diameter gear 142 mounted upon shaft 44, which freewheelingly supports the acceleration idler 46 and which simultaneously rotates feed rolls 40 and 42. The shaft 44 also has mounted thereto a pulley 144. Drive is imparted to the shaft 28 upon which the picker rolls 24, 26 are mounted, by means of pulley 148 and O-rings 146 which are entrained about pulleys 144 and 148.

Gear 128, mentioned previously, meshes with a large diameter gear 130 mounted upon shaft 132. Also mounted upon shaft 132 is a smaller diameter gear 135 which meshes with gear 134 mounted upon the shaft 82, which carries the stacker wheels 18 and 20 and flywheel 138. Gear 134 is coupled to shaft 82 through a one-way clutch assembly 136, to be more fully described. The fly wheel member 138 is also mounted upon shaft 82 and cooperates with one-way clutch assembly 136 in a manner to be more fully described, to assure that the last sheet fed to the stacker assemblies 18 and 20 reaches the stacker plate 22, even if the machine has stopped abruptly.

The use of the gear train comprised of gears 128, 130, 134, 135 and 142, assures a synchronized timing operation as between the feed rolls 40, 42, acceleration roll 50 and stacker wheels 18 and 20. The timing relationship as between the picker rolls 24, 24 and the feed rolls 40, 42 is not critical and hence a pulley and belt drive assembly may be utilized, although the pulley and belt drive assembly comprised of polleys 144 and 148 and O-rings 146, may be replaced by a timing belt and cooperating timing belt pulleys when it is desired to synchronize the operation of the picker rolls 24, 26 with the feed rolls 40, 42 and acceleration roll 50.

By utilizing a pulley and belt drive assembly between motor 84 and the aforementioned gear train, any jamming of any gears or members within the gear train are prevented from being positively coupled back to motor 84, thereby providing a safety operating feature.

In the event that an abrupt stoppage of the device 10 is called for, for any reason, whereupon motor 84 is caused to abruptly deenergize, all of the shafts driven by the associated gears 130 through 142 are abruptly brought to a halt. However, gear 134 couples drive to shaft 82 through one-way clutch 136, the sense of gear 136 is such to allow shaft 82 to rotate in a freewheeling manner relative to gear 134 and, under the influence of flywheel 138, enables the flywheel 138 and stacker wheels 18 and 20 to rotate through an angle of at least one-quarter turn and preferably one-half turn, thereby assuring that the last sheet (or sheets) delivered to stacker wheels 18 and 20 arrive at and are neatly stacked upon the outfeed stacker plate 22.

Figures 9, 9A:
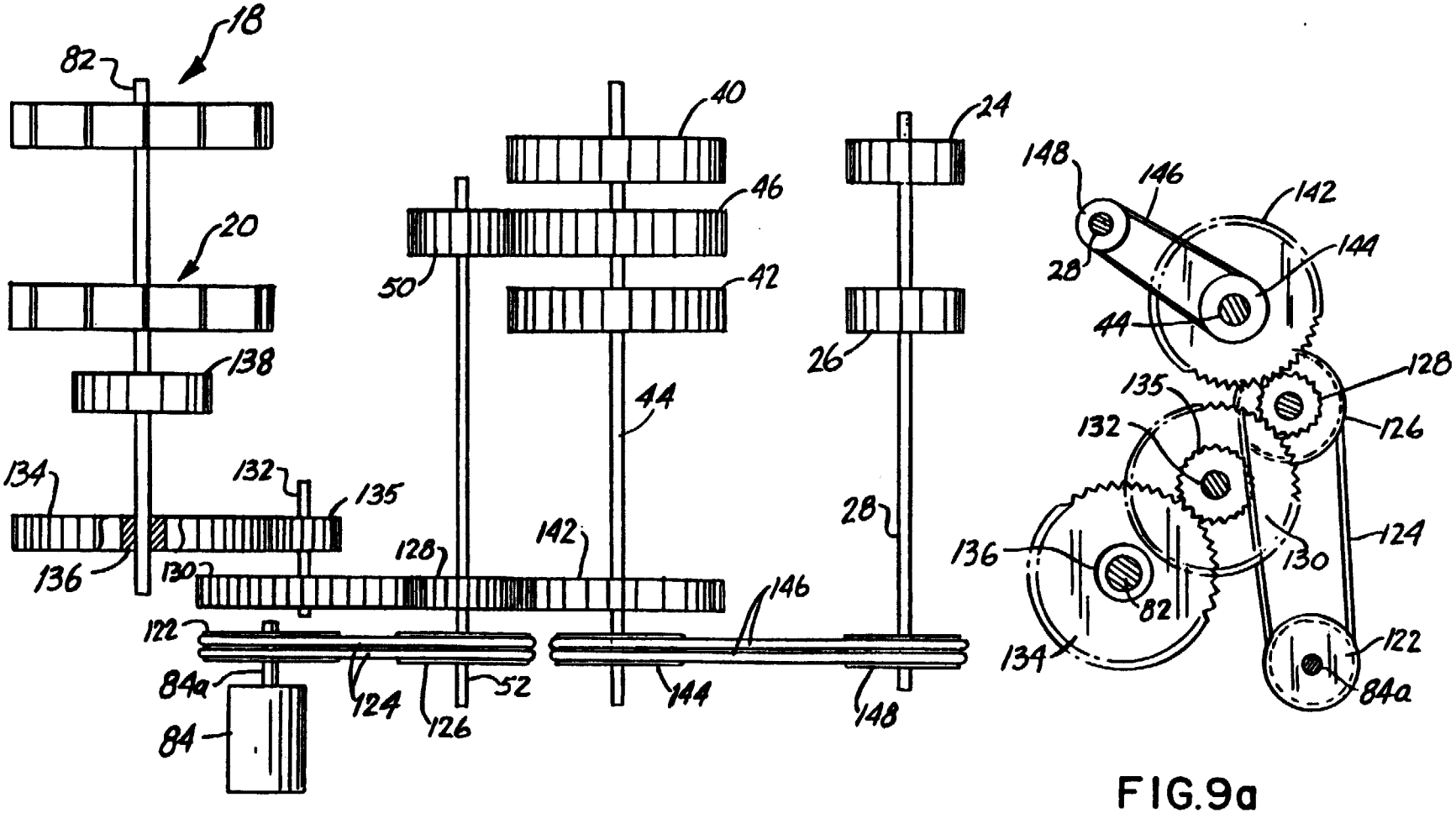

It should be understood that FIG. 9 shows a simplified plan view of the drive and the manner in which all of the wheels and rollers are powered, while FIG. 9a shows an elevational view which more accurately depicts the physical locations of each of the gears and pulleys shown in FIG. 9.

Having now described in detail all of the mechanisms and components, the invention will now be described in more detail in connection with FIGS. 2a, 4a, 4b and 4d.

A stack of sheets such as, for example, paper currency S, is placed in the infeed stacker 14. Picker rolls 24, 26 rotate in a counterclockwise direction as shown by arrow 152 to feed the bottom sheet toward the pair of stripper shoes 36, 38 and cooperating feed rollers 40 and 42. The leading edge of the sheet advanced by picker rolls 24, 26 enters into the tapered throat region T. As was previously mentioned, the picker rolls 24, 26 are eccentrically mounted so as to periodically extend through opening 30 to engage the bottom sheet and jog the stack S of sheets which serves to loosen the stack and facilitate feeding.

The aforementioned bottom sheet which has now entered into throat T (see FIG. 4e) is engaged on its undersurface by the feed rollers 40 and 42, which are rotating counterclockwise as shown by arrow 154, and is engaged along its opposite surface by the stripper shoes 326, 38. As was previously mentioned, the feed rollers 40 and 42 as can best be seen in FIGS. 4a and 4b, have a large peripheral portion having a relatively low coefficient of sliding friction which is formed by member 60 as shown best in FIGS. 6a and 6b, while the remaining smaller peripheral portion, formed by member 62 shown in FIGS. 7a and 7b, has a larger coefficient of sliding friction.

The coefficient of sliding friction of the stripper shoes 36, 38, although greater than the coefficient of sliding friction of the peripheral portions defined by member 60, is nevertheless less than the coefficient of sliding friction of the peripheral portions defined by member 62. The dimensions of the stripper shoes 36 and 38 are such that they are capable of partially extending into the shallow recess 40a, shown best in FIG. 4f. The width W of the stripper shoe 36, shown in FIG. 4f, is slightly less than the width W1 of recess 40a. Thus, the stripper shoe 36 although extending partially into recess 40c, does not normally engage the feed roll 40.

In one preferred embodiment, the depth of recess 40a is of the order of from 0.050 to 0.060 inches and the distance between the adjacent surfaces of the stripper shoe 36 and recess 40c is of the order of 0.020 to 0.025 inches.

Figure 4D:
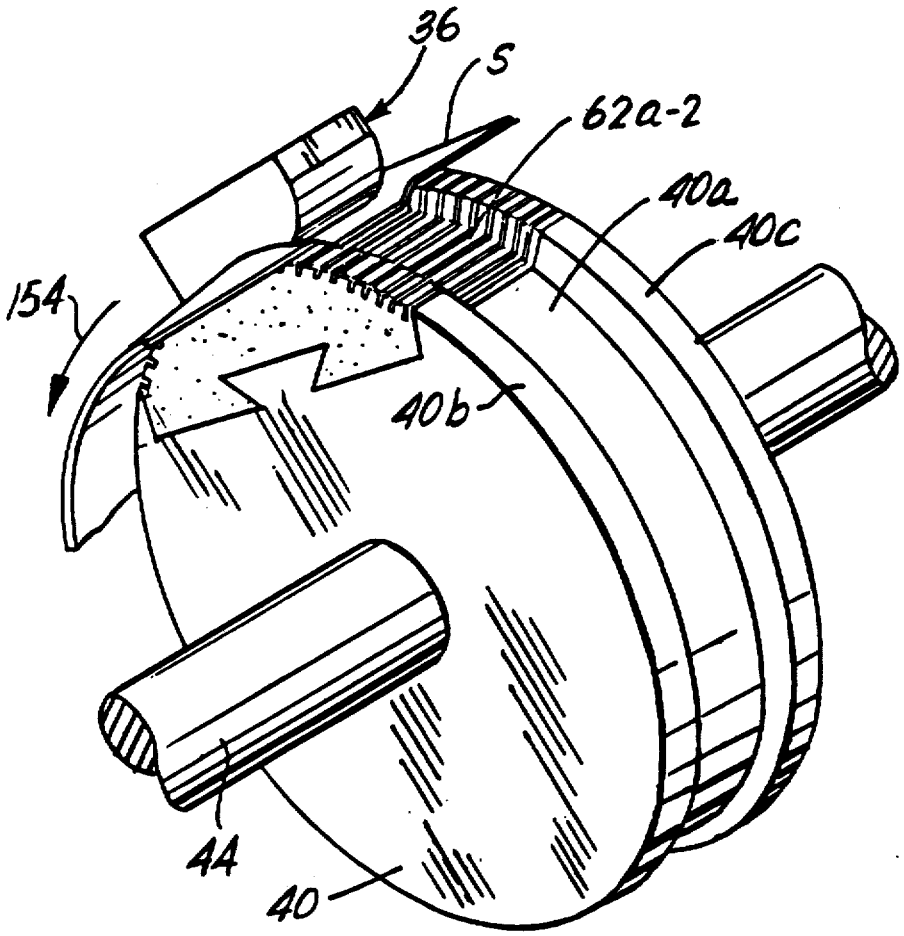

When the sheet S' enters into the region between the stripper shoe 36 and feed roller 40, shown best in FIG. 4d, and the portion of the feed roller 40 formed by the member 60 is passing beneath stripper shoe 36, the sheet is urged into an undulating configuration, as shown in FIG. 4d. However, very little feeding occurs at this time since the coefficient of sliding friction of the peripheral surface formed by member 40 is very low and further, since the stationary stripper shoe 36 imparts a drag upon the sheet.

However, as soon as the portion of the peripheral surface formed by member 62 and having a substantially greater coefficient of sliding friction engages the sheet in the region beneath stripper shoe 36, the leading edge of the sheet is grabbed and is very positively fed in the forward feed direction, as represented by arrow 154, shown for example in FIGS. 2a and 4d. Since the coefficient of sliding friction of the portion of rollers 40 and 42 formed by members 62 is significantly greater than the coefficient of sliding friction of stripper shoes 36 and 38, the feed rollers 40 and 42 exert the dominant influence upon the sheet S', causing the sheet to feed beneath the stripper shoes 36 and 38, and thereafter to move into the curved guideway defined by the feed rollers 40 and 42, and the curved guide plates 72 and 74. The curved guide plates 72 and 74, as were described hereinabove, have a larger throat portion in the region of stripper shoes 36 and 38 which throat tapers to a narrower guideway region toward the lower ends thereof. Thus, as the sheet S' moves past point P shown in FIG. 4e, the sheet is retained substantially in engagement with feed rollers 40 and 42 by means of guide plates 72 and 74. Sufficient frictional drive is imparted to the sheet to cause it to follow the curved guideway defined by curved guide 72 and 74 and feed rollers 40 and 42, until the leading edge moves into the region of the nip N formed by rolling engagement between acceleration roll 50 and idler roll 46, shown best in FIG. 4a, 4b and 4e. It should be noted that the guide plates 72 and 74 have been omitted from FIGS. 4a and 4b for purposes of clarification of the components shown therein. Idler roll 46, although rotating faster than feed rolls 40 and 42, has an insignificant effect upon the sheet until the leading edge of the sheet reaches the nip N.

The surfaces of idler roll 46 and acceleration roll 50 serve to "grab" the leading edge of the sheet entering into nip N (see FIG. 4e), to abruptly accelerate the sheet so as to significantly increase the linear velocity of the sheet and move the sheet in the direction shown by arrow 158, as shown in FIGS. 2a and 4e, toward the guide plate 76 through which the flexible resilient blades 18a and 20a of stacker sheets 18 and 20 extend.

The rapid acceleration of each sheet as it enters into the nip N increases the gap between the trailing edge of an accelerated sheet and the leading edge of the next sheet yet to move into the nip N. The gap between sheets is utilized for counting purposes and, more specifically, counting is utilized for counting purposes and, more specifically, counting is accomplished through the employment of the LED 78 and the phototransistor element 80 which are shown mounted along opposite sides along the curved guideway defined by curved guide plates 72 and 74. Elements 78 and 80 serve to differentiate between the passage of sheets and the passage of a gap between sheets to count the sheets.

The gap is further significantly increased through the use of the feed rollers 40 and 42 having portions thereof provided with significantly different coefficients of sliding friction, as was described hereinabove. Thus, when the leading edge of a sheet moves into the throat region T between strippers 36 and 38 and the cooperating feed rolls 40 and 42, the sheet is not effectively advanced until the peripheral portion of the feed rolls 40, 42 having the significantly greater coefficient of sliding friction moves beneath its associated stripper shoe 36 and 38. By delaying the feeding of each sheet until the portion of each feed roll 40 and 42 having the greater coefficient of sliding friction, moves beneath its associated stripper shoe 36 and 38, the gaps between adjacent sheets are further increased to assure and significantly enhance the counting operation for sheets.

The operation of apparatus 10, in accordance with operating panel 170, is as follows:

The front control panel 200 includes start button 202, stop button 204, count button 206, batching control buttons 208 through 216 and illuminating display panels 218 and 220 for respectively displaying batch quantities and regular count quantities.

The key functions are as follows:

Depressing start key 202 energizes motor 84 (FIG. 9) and resets any error condition presently being displayed by visually observable display 218. If no sheets are in the output stacker 22, the count displayed will be zero.

Depressing stop key 204 turns motor 84 off, and inhibits automatic starting.

Depressing any one of the batch keys 208 through 216 selects the batch desired. This capability allows sheets to be batched in quantities determined by the batch key selected. For example, to batch quantities of 50 sheets, key 214 is depressed. As long as a sufficient number of sheets are present in the feed hopper 14 to form a batch of 50, a batch of 50 sheets will be counted and collected in outfeed stacker 22, and motor 84 will be deenergized.

A sensor 240 which may preferably be comprised of a cooperating light source (for example, an LED) and phototransistor, are positioned to cooperate with an opening in tray portion 12d-4. For example, the light source may be arranged to direct a beam of light at a 45° angle through said opening and the light sensitive element may be arranged to receive light reflected from the bottom sheet in the stack, said light being reflected at an angle of 45°. In the absence of any sheet in the infeed stacker 14, no light from the LED is reflected toward the light sensitive element. In order to prevent ambient light from falsely triggering light sensitive element, the LED may be selected to emit light of a particular wavelength such as infrared, while the light sensitive element preferably is provided with a filter positioned in front of its light sensitive surface to pass only light in the infrared wavelength to the light sensitive surface of the light sensitive element.

When at least one sheet is placed in infeed hopper 14, the apparatus 10 is energized, including motor 84. As soon as the light source/light sensitive element combination 78–80 counts 50 sheets (assuming the example given above) the batching operation will halt. Sensor assembly 242 mounted to outfeed stacker 22 by bracket 244 may be substantially of the same design and function in the same manner as the sensor assembly 240 provided in the infeed hopper 14. As an example, assuming that key 214 is depressed, and a number of sheets are placed in the infeed hopper 14 sufficient to form at least one group of 50 sheets, the covering of sensor 240 starts the machine and 50 sheets are delivered to the outfeed stacker 22 covering sensor 242. This time, apparatus 10 stops. When the 50 sheets are removed from output stacker 22, sensor assembly 242 is uncovered, allowing the apparatus 10 to initiate formation of the next batch of sheets.

The sensor in the output tray acts like a "continue" button. If sheets are in the input hopper 14, removing the finished stack of sheets within outfeed stacker 22 allows apparatus 10 to continue operation and begin forming a new batch. If too few sheets are provided in infeed hopper 14 to form a full batch of the desired number of sheets, apparatus 10 will stop until further sheets are placed in infeed hopper 14 to again "cover" the sensor assembly 240. The above operating steps are repeated until all the sheets desired to be batched have been so batched.

Depressing count key 206 causes all the sheets placed in infeed hopper 14 to be counted until the infeed hopper 14 is emptied of sheets, at which time the counting operation will terminate, but with the total count remaining in storage and being displayed by display 220.

If sheets are removed from output stacker 22 before placing more sheets in input hopper 14, the count will start from zero as soon as a new stack of sheets are placed in infeed hopper 14.

In addition to the above, it can be seen that sheets in moving from the stripper shoes 36 and 38 toward the nip N, are always positively driven and, contrary to prior art techniques in which the sheet enters into a free flight region, the continuous and positive drive of sheets in the present invention assures positive, accurate handling of sheets and prevents sheets from being in any way deflected away from the intended path of movement.

As an example, if a sheet has a permanent curl, the sheet will nevertheless be positively driven from the time it moves between stripper shoes 36 and 38 and feed rolls 40 and 42, until the leading edge enters into the aforesaid nip N. This is also the case even if the leading edge of a sheet is folded over or creased.

Contrary thereto, in the prior art apparatus, a sheet having a curvature or a folded or creased edge will tend to resume its curved or creased configuration and will cause the sheet to deviate from its normal intended path of movement.

The handling of sheets through the apparatus of the present invention can be understood with still greater clarity from a consideration of one preferred embodiment thereof, the picker rolls 24, 26 rotate at an r.p.m. sufficient to provide a tangential velocity of the order of 211 inches per second. The feed rollers 40, 42 are rotated at an r.p.m. sufficient to provide a tangential velocity of 63 inches per second at their respective surfaces. The acceleration roll 50 is rotated at an r.p.m. sufficient to provide a tangential velocity at the periphery of acceleration roll 50 of the order of 135 inches per second. The r.p.m. of the stacker wheels 18, 20 is sufficient to move the tips of the resilient blades 18, 20 is sufficient to move the tips of the resilient blades **18*a* and 20*a*** at a tangential velocity of the order of 32 inches per second. Given these respective operating velocities, a gap of the order of 2.28 inches between adjacent documents is provided and sheets, such as U.S. paper currency, are separated, counted and restacked at a rate of the order of 1,000 per minute. The above operating speeds are merely exemplary and it should be understood that these speeds may be raised or lowered to suit the needs of the particular application .

The stacker 22, described hereinabove in connection with FIG. **2*a*, is shown in solid line fashion in preparation for receiving sheets. The stacker plate portion 22*a* is guided between a pair of channels arranged on opposite sides of the machine frame. FIG. 2*a* shows one such channel 162 having a centrally aligned groove 162*a* for receiving one marginal edge of plate 22*a*, enabling the stacker 22 to experience linear movement. The stacker 22 is retained in the solid line position by means of spring 88, having a first end 88*a* fixed to a stationary point 165 and having its opposite end secured to a downwardly extending ear 22*c* arranged at the left-hand end of plate portion 22*a*. As more sheets are accumulated upon stacker 22, as soon as the thickness of the stack is greater than the distance between plate portion 76*c* and stacker plate portion 22*b*, the stack of sheets urges the stacker 22 in the direction shown by arrow 172 and against the influence of biasing spring 88. The stacker may move, for example, to the dotted line position 22'** to accommodate a relatively large stack of sheets which have been separated and counted.

Figure 8B:
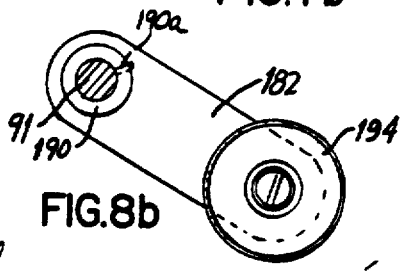
Figure 8A:
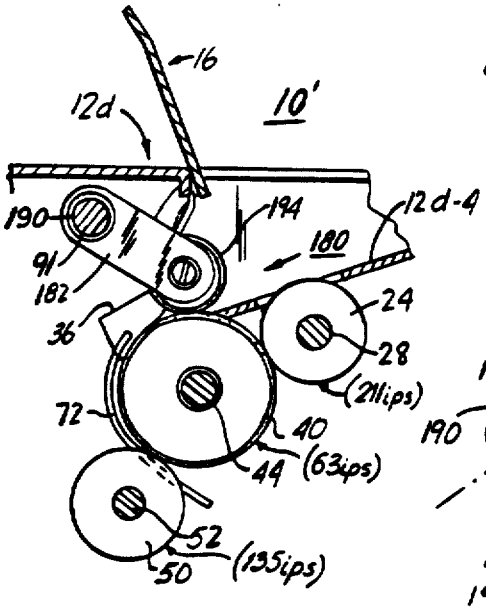
Figure 8C:
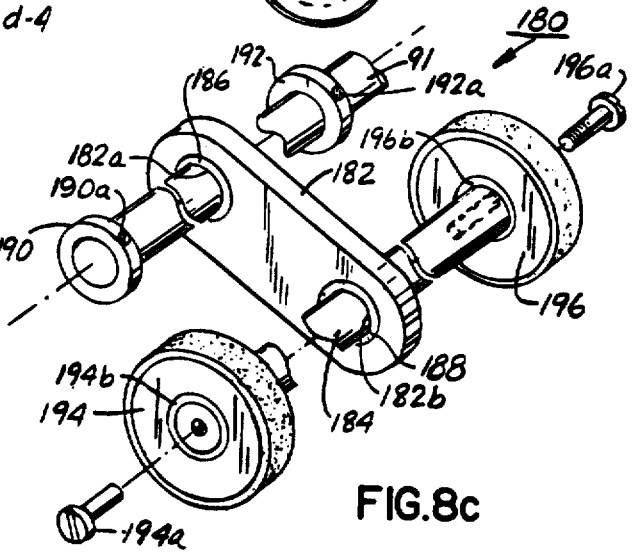

FIGS. **8*a*, 8*b* and 8*c* show another alternative embodiment 10' of the present invention which is utilized to facilitate the positive and accurate handling of light, fluffy sheets or documents and is similar to the document handling and counting apparatus 10 shown, for example, in FIGS. 2*a* and 2*b*, except for the addition of a dancer roll assembly 180 comprised of an arm 182 having an opening 182*a* for swingable mounting upon shaft 91 and having a second opening for receiving shaft 184. Bearings 186 and 188 are preferably arranged within openings 182*a* and 182*b*. A pair of cylindrical rings 190 and 192 are arranged upon shaft 191. These rings are provided with set screws 190*a*, 192*a*. Rings 190, 192 are slidably moved adjacent the opposite sides of swingable arm 182. FIG. 8*c* shows the rings 190 and 192 separated from lever 182 merely for purposes of simplicity it being understood that rings 190 and 192 are positioned adjacent lever 182 to prevent lever 182 from experiencing any linear movement along the axis of shaft 91**.

Shaft 184 extends through opening 188 and has provided at its opposite ends a pair of rollers 194, 196 secured to shaft 184 by fasteners **194*a*, 196*a* respectively. Rollers 194 and 196 may, if desired, be freewheelingly mounted upon shaft 194 by means of bearings 194*b*, 196*b*** respectively.

As can best be seen from a consideration of FIGS. **8*a* and 8*b*, the free end of lever 182 is urged downwardly toward feed rollers 40, 42 by gravity. Rollers 194** and 196 rollingly engage associated feed rollers 40, 42 respectively and cooperate with the feed rollers 40, 42 to impart some drive to sheets, and especially light, thin, fluffy sheets in order to be assured that their leading edges are driven into the tapering throat regions T formed between the stripper assemblies 36, 38 and their cooperating feed rollers 40 and 42. Thicker, less bendable sheets tend to cause the dancer roll assembly rollers 194, 196 of the dancer roll assembly 180 to move away from the feed rollers 40, 42 and thereby have an insignificant effect upon the feeding of thicker, heavier and hence more manageable documents or sheets. If desired, the rollers 194, 196 may be arranged to engage idler 46 to initiate movement of sheets to enter throat T.

As another alternative arrangement (see FIG. 2a), the dancer roll assembly 180 may be replaced by a substantially C-shaped spring member 202 which lightly engages the top surface of each feed roll 40, 42 (or idler 46) to urge light, thin, fluffy documents between spring member 202 and feed rolls 40 and 42 to be assured that the leading edge of the bottom sheet fed therebetween reaches the entrance throat T between the stripper shoes 36, 38 and their cooperating feed rolls 40 and 42. Again, this light spring element 202 is required only during the handling of thin, light fluffy sheets and will be bent back away from the feed rolls 40 and 42 (or idler 46) when handling heavier, thicker, less bendable sheets. As a result, the light spring-loaded member 202 has substantially no effect upon thicker sheets, while having an increasingly greater effect when feeding thinner, lighter, fluffier sheets.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. Apparatus for separating sheets regardless of their quality or stiffness, comprising:

input and output paths along which the said sheets are moved;

a curved guideway for guiding sheets leaving the input path to guide said sheets to enter the output path;

first rotatable means engaging each sheet and cooperating with said curved guideway for moving sheets at a first velocity along said curved guideway toward said output path; and having second means including second rotatable means coaxial with said first rotatable means for engaging the leading edge of each sheet for abruptly imparting an acceleration force upon each sheet independent of said first means for accelerating the sheets to a higher velocity, said force being exerted just before the leading edges of the sheets leave said curved guideway and the influence of said first means and approach the output path to provide a gap between adjacent ends of successive sheets.

2. The apparatus of claim 1, wherein said first means comprises roller means mounted to rotate about a first imaginary axis.

3. The apparatus of claim 1, further comprising stripper means cooperating with said first means for preventing multiple fed sheets passing between said stripper means and said first means from moving between said first means and said guideway and to assure advancement of only single sheets into the region formed between said curved guideway and said first means.

4. The apparatus of claim 3, wherein said first means comprises roller means mounted to rotate about a first axis.

5. The apparatus of claim 4, wherein the periphery of said roller means is provided with a periphery comprised of a first portion having a low coefficient of sliding friction and a second portion having a high coefficient of sliding friction cooperating with said stripper means for staggering the delivery of sheets to said guideway.

6. The apparatus of claim 2, wherein said second rotating means comprises idler means mounted to rotate about said first axis;

moving acceleration means rollingly engaging said idler means forming a nip at the point of rolling engagement;

said first means and said curved guideway cooperating to guide sheets to enter said nip and be accelerated thereby as the sheets enter the output path.

7. The apparatus of claim 6 wherein at least one of said idler means and said acceleration means is formed of a resilient compressible material.

8. The apparatus of claim 6 wherein said acceleration means is formed of a resilient compressible material.

9. The apparatus of claim 7 wherein said acceleration means is formed of a resilient compressible material.

10. The apparatus of claim 6 wherein the coefficient of friction of the periphery of at least one of the idler means and acceleration means is selected to provide a suitable pulling force on sheets engaging the idler means.

11. The apparatus of claim 6 wherein the coefficient of friction of the periphery of the acceleration means is selected to provide a suitable pulling force on sheets engaging the acceleration means.

12. The apparatus of claim 6, wherein said idler means comprises an idler roller freewheelingly mounted on said axis and rotated by said acceleration means.

13. The apparatus of claim 12 wherein said acceleration means comprises an acceleration roller rollingly engaging said idler roller when no sheets pass said nip.

14. The apparatus of claim 13 further comprising an infeed stacker for supporting a stack of sheets to be separated;

the base of said infeed stacker being substantially coplanar with said first path;

eccentric feeder means for advancing the bottom sheet in said stack along said input path towards said curved guideway.

15. The apparatus of claim 14 wherein said feeder means comprises a feeder roller.

16. The apparatus of claim 15 wherein said feeder roller is eccentrically mounted about an axis of rotation.

17. The apparatus of claim 16 wherein said infeed stacker includes a support plate having an opening, said feeder roller at least partially extending through said opening during a portion of the rotation of said feeder roller.

18. The apparatus of claim 1 further comprising rotating sheet receiving means including a wheel having a plurality of curved resilient blades arranged at spaced intervals about said wheel, adjacent blades cooperating to form curved pockets for receiving sheets delivered to said output path by said second means;

output stacker means including means for stripping sheets from said pockets.

19. The apparatus of claim 1 further comprising stacker means for stacking sheets delivered to said output path said stacker means comprising a movable stacker plate for supporting sheets in a substantially upright position, the free end of said stacker plate extending upwardly from said plate, whereby sheets delivered to said stacker means are maintained in said upright position.

20. The apparatus of claim 19 further comprising mounting means for slidably mounting said stacker plate;

bias means for urging said stacker plate in a first direction to be retracted into said mounting means, the free end of said stacker plate being movable outwardly and away from said mounting means as the number of sheets in the stack increases.

21. The apparatus of claim 13 further comprising means for sensing the gaps between adjacent sheets for counting said sheets as they pass said second means.

22. The apparatus of claim 13 further comprising roller means having a resiliently mounted roller surface urged against said idler means for advancing sheets moving between said roller means and said idler means toward said curved guideway.

23. The apparatus of claim 13 wherein said first means comprises a pair of drive rollers arranged upon a common axis;

said second rotating means comprising an idler roller positioned between said drive rollers and arranged to rotate on said common axis independently of said drive rollers;

an acceleration roller engaging said idler roller;

said curved guideway comprising plate means arranged adjacent to the peripheries of said drive rollers for guiding sheets about the drive rollers for delivery towards a location for collecting the sheets.

24. Apparatus for handling sheets comprising: a plurality of rollers mounted for simultaneous rotation upon a common axis;

stripper means cooperating with at least a first one of said rollers and forming a first nip for preventing the passage of more than a single sheet through said first nip;

acceleration means cooperating with a second one of said rollers and forming a second nip displaced from said first nip;

curved guide means for guiding sheets passing said first nip along a curved path towards said second nip whereby sheets are abruptly accelerated upon entering said second nip to form a finite gap between the adjacent edges of neighboring sheets ejected from said second nip.

25. The apparatus of claim 24 wherein the rollers mounted to rotate about a common axis rotate independently of one another.

26. The apparatus of claim 24 wherein a shaft is provided along said common axis and one of said rollers is fixed to said shaft while the other of said rollers is freewheelingly mounted upon said shaft.

27. The apparatus of claim 24 wherein the roller cooperating with said stripper means is provided with an annular periphery having a first peripheral portion with a coefficient of sliding friction which is greater than the coefficient of sliding friction of the remaining peripheral portion.

28. The apparatus of claim 24 wherein pivotally mounted support arm means is provided for supporting both said stripper means and said curved guide means.

29. The apparatus of claim 28 further comprising means on said support arm means for adjustably supporting said stripper means for selectively positioning said stripper means relative to the roller cooperating therewith.

30. The apparatus of claim 28 wherein said support arm means is swingably mounted for movement between an operative position wherein said stripper means is in its cooperating relationship with its associated roller and [in operative] *an inoperative* position wherein said stripper means is displaced from its associated roller.

31. The apparatus of claim 30 further comprising resilient locking means for releasably retaining said support arm means in the operative position and providing a biasing force resiliently urging said stripper means toward its associated roller.

32. The apparatus of claim [30] *31* wherein said resilient locking means comprises a resilient spring pivotally mounted to a stationary pivot at one end thereof and having a clip-like structure for snappingly locking with said support arm means.

33. The apparatus of claim 28 further comprising adjustment means for adjusting the support arm means in the operative position relative to said rollers.

34. The apparatus of claim 33 wherein said adjustment means comprises a stationary member positioned a displaced distance from said rollers and axially adjustable means mounted upon said support arm means and having a tip projecting therefrom sand engageable with said stationary [means] *number* for adjusting the position of the support arm means relative to said stationary [means] *number* through movement of said axially adjustable means to thereby adjust the position of said stripper means relative to its associated roller.

35. The apparatus of claim 24 further comprising a dancer assembly mounted above said common axis and having one end thereof slidably engaging the periphery of the roller cooperating with said stripper means and exerting a light force thereagainst to facilitate the feeding of light, fluffy sheets into said first nip.

36. The apparatus of claim 35 wherein said dancer assembly comprises roller means freewheelingly mounted upon the first end of an arm, the opposite end of which is pivotally mounted above said common axis whereby said roller means rollingly engage one of the rollers mounted upon said common axis to facilitate the feeding of light, fluffy sheets into said first nip.

37. The apparatus of claim 35 wherein said dancer assembly comprises a leaf spring having a free end portion engaging the surface of one of said roller means mounted upon said common axis and having the opposite end thereof mounted to a stationary pivot, said spring [means] exerting a light spring force upon the roller means it engages and being easily moveable away from said roller means in the presence of stiffer and/or thicker sheets.

38. The apparatus of claim 24 wherein the roller means cooperating with said stripper means is provided having an annular periphery with a recess extending therearound;

said stripper means having a width slightly less than the width of said recess and projecting at least slightly into said recess to cause sheets fed into said first nip formed thereby to assume a curved configuration which facilitates feeding and handling thereof.

39. The apparatus of claim 38 wherein the coefficient of sliding friction of the stripper means is less than the coefficient of sliding friction of at least a portion of the surface of the roller cooperating with said stripper means to form said first nip.

40. The apparatus of claim 24 further comprising means for sensing the presence of gaps between documents located downstream of said second nip to facilitate the counting of said documents.

41. The apparatus of claim 24 further comprising a dancer assembly swingably mounted above said common axis and having one end thereof extending downwardly toward the periphery of the roller cooperating with said stripper means to facilitate the smooth feeding of sheets through said first nip.

42. The apparatus of claim 41 wherein said dancer assembly comprises a pair of members each extending toward an associated one of said rollers cooperating with said stripper means.

43. Apparatus for separating sheets comprising input and output paths along which sheets are moved;

a guideway having a curved portion for guiding each sheet leaving the input path to enter the output path;

first rotatable means cooperating with said guideway for moving sheets at a predetermined speed along said guideway toward said output path;

second means including second rotatable means coaxial with said first rotatable means for abruptly accelerating the sheets to a higher velocity and engaging the leading edge of a sheet and accelerating the engaged sheet when the trailing edge of the sheet leaves the the influence of said first means as the sheet approaches the output path to provide a gap between adjacent sheets moving in said output path.

44. The apparatus of claim 43, further comprising means for swingably mounting at least a portion of said guideway to move said guideway from a first position towards a second position away from the first and second means to facilitate inspection and repair;

and means for releasably locking said mounting means in said first position.

45. The apparatus of claim 43, further comprising resilient latch means for releasably latching said guideway in the operative position.

46. The apparatus of claim 43, wherein said guideway cooperates with both said first and second means for guiding moving sheets between the input and output paths.

47. The apparatus of claim 43, wherein at least one of said first and second means cooperates with said guideway for providing positive drive to a sheet as it moves between the input and output paths.

*48. Apparatus for handling sheets comprising:*

*a plurality of rollers mounted for simultaneous rotation about a substantially common axis;*

*stripper means cooperating with at least one of said rollers and forming a first nip for preventing the passage of more than a single sheet through said first nip;*

*cooperating roller means rollingly engaging another one of said plurality of rollers for forming a second nip displaced from said first nip;*

*curved guide means for guiding sheets passing said first nip along a curved path towards said second nip whereby sheets entering said second nip are advanced to an outfeed location for collection;*

*said plurality of rollers mounted to rotate about said substantially common axis being rotatable independently of one another.*

*49. The apparatus of claim 48 wherein at least a portion of the periphery of said one of said plurality of rollers is substantially aligned with the periphery of said cooperating roller means to position said second nip along said curved guide path to assure that sheets delivered to said second nip are advanced toward said outfeed path.*

*50. The apparatus of claim 48 wherein the periphery of said one of said rollers cooperating with said stripper means is provided with a first peripheral portion having a coefficient of sliding friction which is greater than the coefficient of sliding friction of the remaining peripheral position.*

* * * * *

UNITED STATES PATENT AND TRADEMARK OFFICE

CERTIFICATE OF CORRECTION

PATENT NO. : Re. 33,847

DATED : March 17, 1992

INVENTOR(S) : JOHN DiBLASIO

It is certified that error appears in the above-identified patent and that said Letters Patent is hereby corrected as shown below:

Column 24, line 42 - "position" should read -- portion --.

Signed and Sealed this

Fourth Day of May, 1993

Michael K. Kirk

MICHAEL K. KIRK

*Acting Commissioner of Patents and Trademarks*

*Attest:*

*Attesting Officer*